United States Patent
Guo et al.

(10) Patent No.: US 9,467,701 B2
(45) Date of Patent: Oct. 11, 2016

(54) CODED BLOCK FLAG CODING

(71) Applicant: Qualcomm Incorporated, San Diego, CA (US)

(72) Inventors: Liwei Guo, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 13/739,598

(22) Filed: Jan. 11, 2013

(65) Prior Publication Data

US 2013/0266074 A1    Oct. 10, 2013

Related U.S. Application Data

(60) Provisional application No. 61/620,765, filed on Apr. 5, 2012.

(51) Int. Cl.
| | |
|---|---|
| *H04N 7/50* | (2006.01) |
| *H04N 19/96* | (2014.01) |
| *H04N 19/46* | (2014.01) |
| *H04N 19/186* | (2014.01) |
| *H04N 19/176* | (2014.01) |
| *H04N 19/70* | (2014.01) |

(52) U.S. Cl.
CPC ...... *H04N 19/00969* (2013.01); *H04N 19/176* (2014.11); *H04N 19/186* (2014.11); *H04N 19/46* (2014.11); *H04N 19/70* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 2011/0249721 A1 | 10/2011 | Karczewicz et al. | |
| 2011/0274158 A1* | 11/2011 | Fu | H04N 19/00006 375/240.02 |
| 2012/0106649 A1 | 5/2012 | Wang et al. | |
| 2012/0114034 A1* | 5/2012 | Huang et al. | 375/240.03 |
| 2012/0177116 A1* | 7/2012 | Panusopone et al. | 375/240.12 |
| 2012/0183080 A1* | 7/2012 | Zhou | 375/240.26 |
| 2012/0195379 A1* | 8/2012 | Alshin et al. | 375/240.12 |

(Continued)

OTHER PUBLICATIONS

An J., et al., "Non-CE2: Separate RQT structure for Y; U and V components", 99. MPEG Meeting; Jun. 2, 2012-Oct. 2, 2012; San Josa CR ; (Motion Picture Expert Group or ISO/IEC JTC1/SC29/WG11),, No. m23190, Jan. 20, 2012, XP030051715, the whole document.

(Continued)

Primary Examiner — Samuel D Fereja
(74) Attorney, Agent, or Firm — Shumaker & Sieffert, P.A.

(57) ABSTRACT

A video encoder generates a bitstream that includes a residual quad tree (RQT) for a coding unit (CU). The CU is larger than a maximum-allowable transform unit (TU) size and the RQT includes a hierarchy of nodes. A root node of the RQT corresponds to the CU as a whole and leaf nodes of the RQT correspond to TUs of the CU. The root node is associated with a coded block flag (CBF) for a chroma component. The CBF for the chroma component indicates whether any of the TUs of the CU are associated with a significant coefficient block that is based on samples of the particular chroma component. A video decoder receives the bitstream and determines, based on the CBF, whether coefficient blocks associated with TUs that correspond to the leaf nodes include non-zero coefficients.

52 Claims, 11 Drawing Sheets

(56) References Cited

U.S. PATENT DOCUMENTS

| | | | |
|---|---|---|---|
| 2012/0201298 A1* | 8/2012 | Panusopone et al. | 375/240.12 |
| 2012/0207222 A1* | 8/2012 | Lou et al. | 375/240.18 |
| 2012/0230411 A1* | 9/2012 | Liu et al. | 375/240.16 |
| 2012/0230421 A1 | 9/2012 | Chen et al. | |
| 2012/0281928 A1* | 11/2012 | Cohen et al. | 382/240 |
| 2013/0003824 A1 | 1/2013 | Guo et al. | |
| 2013/0051452 A1* | 2/2013 | Li et al. | 375/240.01 |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Guo L., et al., "Non-Square Transform for 2NxN and Nx2N Motion Partitions", 97. MPEG Meeting; Jul. 18, 2011-Jul. 22, 2011; Torino; (Motion Picture Expert Group OR ISO/IEC JTC1/SC29/WG11) No. m20996, Jun. 7, 2012, XP030049559.

International Preliminary Report on Patentability—PCT/US2013/032989, The International Bureau of WIPO—Geneva, Switzerland, Jun. 27, 2014.

International Search Report and Written Opinion—PCT/US2013/032989—ISA/EPO—Sep. 16, 2013.

Lee B., et al., "Improved side information signaling for quad-tree based transform structure of TMuC", 94. MPEG. Meeting; Oct. 11, 2010-Oct. 15, 2010; Guangzhou; (Motion Picture Expert Group or ISO/IEC JTC1/SC29/WG11), No. M18091, Oct. 7-15, 2010, 5 pgs, XP030046681.

Zhou M et al., "Evaluation Results on Residual Quad Tree (RQT)", 95. MPEG Meeting, Jan. 24, 2011-Jan. 28, 2011, Daegu, (Motion Picture Expert Group or ISO/IEC JTCI/SC29/WG11), No. m18807, Jan. 16, 2011, XP030047377, abstract, section 1 Introduction, section 4 Conclusions.

Response to Written Opinion dated Sep. 16, 2013, from International Application No. PCT/US2013/032989, filed Nov. 14, 2013, 11 pp.

Second Written Opinion from International Application No. PCT/US2013/032989, dated Mar. 13, 2014, 7 pp.

Response to Second Written Opinion dated Mar. 13, 2014, from International Application No. PCT/US2013/032989, filed on Apr. 11, 2014, 36 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Bross et al., "High Efficiency Video Coding (HEVC) text specification draft 10 (for FDIS & Last Call)," Joint Collaborative Team on Video Coding, JCTVC-L1003_v34, Jan. 14-23, 2013, 310 pp.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27,-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "High efficiency video coding (HEVC) text specification draft 9," Joint Collaborative Team on Video Coding, JCTVC-K1003_v7, Oct. 10-19, 2012, 290 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Sole, et al., "Transform Coefficient Coding in HEVC", Picture Coding Symposium (PCS), 2012, pp. 461-464.

Wiegand et al., "WD2: Working Draft 2 of High-Efficiency Video Coding", Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011, 193 pp.

Wiegand et al., "WD1: Working Draft 1 of High-Efficiency Video Coding", Joint Collaborative Team on Video Coding, JCTVC-C403, Oct. 7-15, 2010, 137 pp.

Tan et al., "On Residual Quad-Tree Coding in HEVC," 2011 IEEE 13th International Workshop on Multimedia Signal Processing (MMSP), Oct. 17-19, 2011, 4 pp.

Bross, et al., "High Efficiency Video Coding (HEVC) text specification draft 9," JCT-VC Meeting; 11th Meeting; Oct. 10-19, 2012; (Joint Collaborative Team on Video Coding (JCT-VC) of ITU-T SG16 WP3 and ISO/IEC JTC1/SC29/WG11) No. JCTVC-K1003)_v8, Nov. 17, 2012; 292 pp.

Taiwan Search Report from Taiwanese Application No. TW102112223, Jun. 14, 2015.

* cited by examiner

CODED BLOCK FLAG CODING

This application claims the benefit of U.S. Provisional Patent Application No. 61/620,765, filed Apr. 5, 2012, the entire content of which is hereby incorporated by reference.

TECHNICAL FIELD

This disclosure relates to video coding and compression and, in particular, to coding of coded block flags.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for signaling the presence of significant coefficient blocks. A significant coefficient block may be a coefficient block that includes one or more non-zero coefficients. More specifically, a video encoder may generate a bitstream that includes data that represent a residual quad tree (RQT) for a coding unit (CU) that is larger than a maximum-allowable transform unit (TU) size. The RQT includes a hierarchy of nodes. A root node of the RQT corresponds to the CU as a whole and leaf nodes of the RQT correspond to TUs of the CU. The root node is associated with a coded block flag (CBF) for a chroma component. The CBF for the chroma component may indicate whether any of the TUs of the CU are associated with a significant coefficient block that is based on samples of the particular chroma component. A video decoder may receive the bitstream and may determine, based on the CBF, whether any of the leaf nodes are associated with a significant coefficient block for the chroma component.

In one aspect, a method for encoding video data comprises generating data that represent a residual RQT for a CU, the CU being larger than a maximum-allowable TU size. The RQT includes a hierarchy of nodes. A root node of the RQT corresponds to the CU as a whole and leaf nodes of the RQT correspond to TUs of the CU. The root node is associated with a CBF for a particular chroma component, the CBF for the particular chroma component indicating whether any of the TUs of the CU are associated with a significant chroma coefficient block that is based on samples of the particular chroma component. The method also comprises outputting a bitstream that includes the RQT for the CU.

In another aspect, a method for decoding video data comprises parsing, from a bitstream that includes an encoded representation of the video data, a CBF of a root node of a RQT of a CU. A pixel block of the CU is larger than a maximum-allowable TU size. The method also comprises, if the CBF has a first value, parsing, from the bitstream, a chroma coefficient block associated with a leaf node of the RQT. If the CBF has a second value that is different than the first value, the chroma coefficient block associated with the leaf node is not parsed from the bitstream.

In another aspect, a video encoding device encodes video data. The video encoding device comprises one or more processors configured to generate data that represents a RQT for a CU, the CU being larger than a maximum-allowable TU size, the RQT including a hierarchy of nodes. A root node of the RQT corresponds to the CU as a whole and leaf nodes of the RQT correspond to TUs of the CU. The root node is associated with a CBF for a particular chroma component, the CBF for the particular chroma component indicating whether any of the TUs of the CU are associated with a significant chroma coefficient block that is based on samples of the particular chroma component.

In another aspect, a video decoding device decodes video data. The video decoding device comprises one or more processors configured to parse, from a bitstream that includes an encoded representation of the video data, a CBF of a root node of a RQT of a CU. A pixel block of the CU is larger than a maximum-allowable TU size. The one or more processors are configured to parse, if the CBF has a first value, from the bitstream, a chroma coefficient block associated with a leaf node of the RQT. If the CBF has a second value that is different than the first value, the chroma coefficient block associated with the leaf node is not parsed from the bitstream.

In another aspect, a video encoding device encodes video data. The video encoding device comprises means for generating data that represent a RQT for a CU, the CU being larger than a maximum-allowable TU size, the RQT including a hierarchy of nodes. A root node of the RQT corresponds to the CU as a whole and leaf nodes of the RQT correspond to TUs of the CU. The root node is associated with a CBF for a particular chroma component, the CBF for the particular chroma component indicating whether any of the TUs of the CU are associated with a significant chroma coefficient block that is based on samples of the particular chroma component.

In another aspect, a video decoding device decodes video data. The video decoding device comprises means for parsing, from a bitstream that includes an encoded representation of the video data, a CBF of a root node of a RQT of a CU. A pixel block of the CU is larger than a maximum-allowable TU size. The video decoding device also comprises means for parsing, if the CBF has a first value, from the bitstream, a chroma coefficient block associated with a leaf node of the RQT. If the CBF has a second value that is different than the first value, the chroma coefficient block associated with the leaf node is not parsed from the bitstream.

In another aspect, a computer-readable storage medium stores instructions that, when executed by one or more processors of a video encoding device, configure the video encoding device to generate data that represent a RQT for a CU, the CU being larger than a maximum-allowable transform unit (TU) size, the RQT including a hierarchy of nodes. A root node of the RQT corresponds to the CU as a whole and leaf nodes of the RQT correspond to TUs of the CU. The root node is associated with a CBF for a particular chroma component, the CBF for the particular chroma component indicating whether any of the TUs of the CU are associated with a significant chroma coefficient block that is based on samples of the particular chroma component.

In another aspect, a computer-readable storage medium stores instructions that, when executed by one or more processors of a video decoding device, configure the video decoding device to parse, from a bitstream that includes an encoded representation of video data, a CBF of a root node of a RQT of a CU. A pixel block of the CU is larger than a maximum-allowable TU size. The instructions also configure the one or more processors to parse, if the CBF has a first value, from the bitstream, a chroma coefficient block associated with a leaf node of the RQT. If the CBF has a second value that is different than the first value, the chroma coefficient block associated with the leaf node is not parsed from the bitstream.

The details of one or more examples of the disclosure are set forth in the accompanying drawings and the description below. Other features, objects, and advantages will be apparent from the description, drawings, and claims.

DETAILED DESCRIPTION

Figure 1:
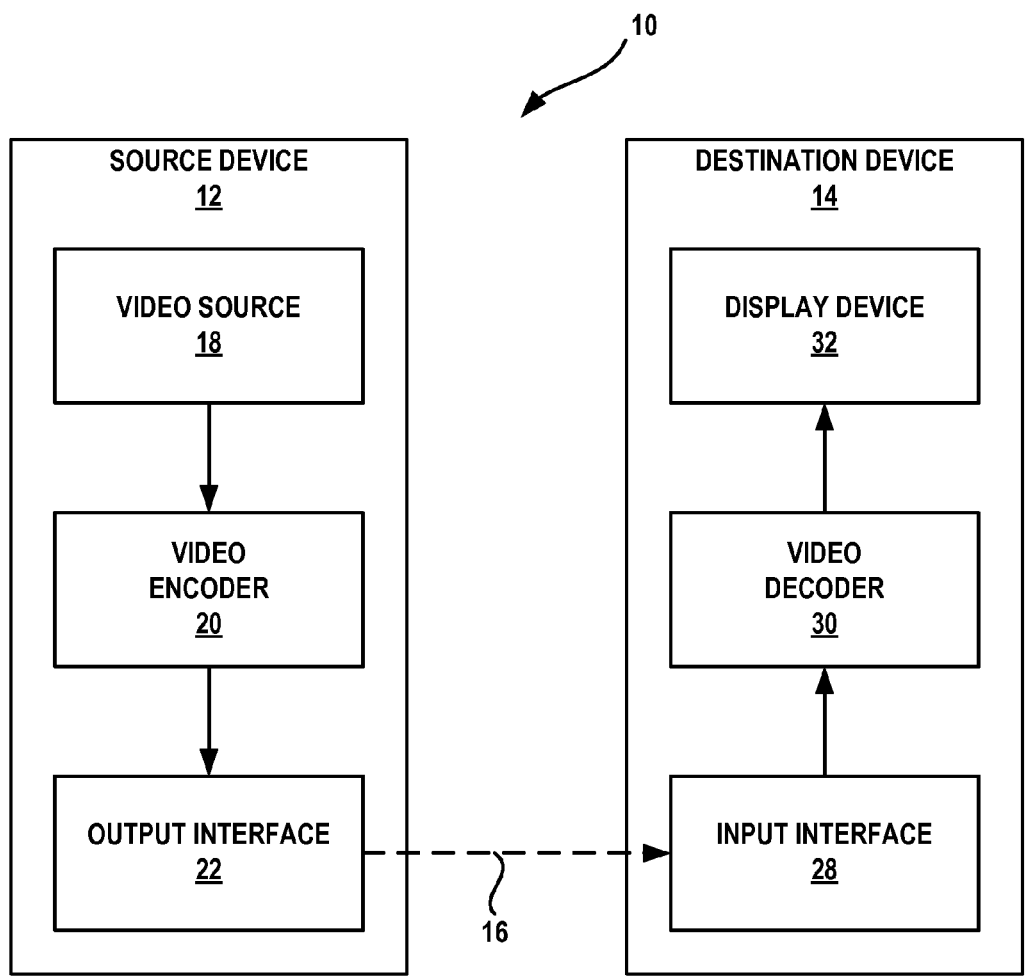
FIG. 1 is a block diagram illustrating an example video coding system that may utilize the techniques of this disclosure.

A video encoder decomposes a residual pixel block of a coding unit (CU) into one or more smaller residual pixel blocks, each of which is associated with a transform unit (TU) of the CU. Each pixel of the residual pixel blocks includes a luma (Y) sample and may also include two chroma samples, U and V. A U sample may indicate a difference between a blue component of a pixel and a Y sample for the pixel. For this reason, a U sample may also be referred to as a Cb sample. A V sample may indicate a difference between a red sample of a pixel and a Y sample for the pixel. For this reason, a V sample may also be referred to as a Cr sample.

Because each residual pixel includes a Y sample and may also include a U sample and a V sample, each of the TUs may be associated with a block of residual Y samples (i.e., a Y residual sample block), a block of residual U samples (i.e., a U residual sample block), and a block of residual V samples (i.e., a V residual sample block). The video encoder may apply one or more transforms to each of the residual sample blocks in order to generate coefficient blocks that correspond to the residual sample blocks. Some of the coefficient blocks include no non-zero coefficients, meaning those coefficient blocks include only zero coefficients. For ease of explanation, this disclosure may refer to a coefficient block as a significant coefficient block if the coefficient block includes one or more non-zero coefficients. If a coefficient block includes no non-zero coefficients (i.e., the coefficient block only includes zero-valued coefficients), it may be more efficient for the video encoder to generate a flag that indicates that the coefficient block includes no non-zero coefficients than to signal each of the zero-valued coefficients of the coefficient block.

The video encoder may generate data that represent a residual quad tree (RQT) for the CU. The RQT may also be referred to as a transform tree. The RQT for the CU comprises a set of nodes. Each of the nodes corresponds to a residual sample block. A root node of the RQT corresponds to the residual pixel block of the CU. Leaf nodes of the RQT correspond to the residual pixel blocks of TUs of the CU. Nodes of the RQT may be associated with split flags. The split flag of a node may indicate whether the node has a plurality of child nodes of the RQT.

Furthermore, in addition to being associated with split flags, each leaf node of the RQT is associated with a luma coded block flag (CBF) that indicates whether the leaf node is associated with a significant luma coefficient block. In this disclosure, a luma CBF may also be referred to as a Y CBF and a luma coefficient block may be referred to as a Y coefficient block. A Y coefficient block is a coefficient block based on a residual Y sample block. In addition to split flags and luma CBFs, the nodes of the RQT may also be associated with U CBFs and V CBFs. A U CBF of a node indicates whether the node, or any descendant node of the node, is associated with a significant U coefficient block. A U coefficient block is a coefficient block based on a residual U sample block. A first node may be a descendant node of a second node if the second node is the root node of the RQT or there is a path through the RQT from the first node to the root node that passes through the second node and does not pass through any node more than once. If the U CBF of a node indicates that the node, and each descendant node of the node, is not associated with a significant U coefficient block, no descendant node of the node is associated with a U CBF. A V CBF of a node indicates whether the node, or any descendant node of the node, is associated with a significant V coefficient block. A V coefficient block is a coefficient block based on a residual V sample block. If the V CBF of a node indicates that the node, and each descendant node of the node, is not associated with a significant V coefficient block, no descendant node of the node is associated with a V CBF. If a node corresponds to a residual sample block that is larger than a maximum-allowable TU size, the node is not associated with a U CBF or a V CBF.

There may be several problems with this system. First, there are different methods for signaling whether nodes of the RQT are associated with significant luma coefficient blocks and significant U and V coefficient blocks. That is, the Y CBFs are only encoded at leaf nodes of the RQT while U and V CBFs may be encoded at non-leaf nodes of the RQT. Second, the hierarchical coding of U and V CBFs only applies to some levels of the RQT. For instance, the video encoder does not signal U and V CBFs at nodes that correspond to residual pixel blocks larger than a maximum-allowable TU size. These problems may increase the complexity of video encoders and video decoders.

In accordance with the techniques of this disclosure, a video encoder may generate data that represents a RQT for a CU. The CU may be larger than a maximum-allowable TU size (i.e., a pixel block associated with the CU may be larger than the maximum-allowable TU size). The maximum-allowable TU size may be a largest allowable size of a pixel block associated with a TU. A root node of the RQT corresponds to the CU as a whole and leaf nodes of the RQT correspond to TUs of the CU. The root node is associated with a CBF for a particular chroma component, the CBF for the particular chroma component indicating whether any of the TUs of the CU are associated with a significant coefficient block that is based on samples of the particular chroma component. The particular chroma component may be a U component or a V component. Similarly, a video decoder may parse, from a bitstream that includes an encoded representation of video data, a CBF of a root node of a RQT of a CU, wherein a pixel block of the CU is larger than a maximum-allowable TU size. If the CBF has a first value, the video decoder may parse, from the bitstream, a chroma coefficient block associated with a leaf node of the RQT. If the CBF has a second value that is different than the first value, the chroma coefficient block associated with the leaf node is not parsed from the bitstream.

The techniques of this disclosure may provide several advantages. For example, if a chroma CBF (e.g., the CBF for the particular chroma component) is not signaled at the root node, chroma CBFs are signaled at each node in a first level of the RQT that corresponds to TUs smaller than the maximum-allowable TU size. In contrast, if a chroma CBF is signaled at the root node of the RQT, the video encoder may not need to signal chroma CBFs at each node of the first level of the RQT that corresponds to TUs smaller than the maximum-allowable TU size, especially if the CBF at the root node has the second value. In this way, the techniques of this disclosure may decrease the number of CBFs signaled, and hence, increase coding efficiency.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a block diagram illustrating an example video coding system 10 that may utilize the techniques of this disclosure. As used described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). Channel 16 may include various types of devices, such as routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. In other examples, video encoder 20 and video decoder 30 may operate according to other video compression standards, including the High Efficiency Video Coding (HEVC) standard presently under development. A draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of Nov. 7, 2012, is downloadable from http://phenix.int-evry.fr/jct/doc_end_user/documents/11_Shanghai/wg11/JCTVC-K1003-v8.zip, the entire content of which is incorporated herein by reference. The techniques of this disclosure, however, are not limited to any particular coding standard or technique.

FIG. 1 is merely an example and the techniques of this disclosure may apply to video coding settings (e.g., video encoding or video decoding) that do not necessarily include any data communication between the video encoding and video decoding devices. In other examples, data is retrieved from a local memory, streamed over a network, or the like. A video encoding device may encode and store data to memory, and/or a video decoding device may retrieve and decode data from memory. In many examples, the video encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which a video decoding device may then retrieve at any time after being stored to this medium.

As mentioned briefly above, video encoder 20 encodes video data. The video data may comprise one or more pictures. Each of the pictures is a still image forming part of a video. When video encoder 20 encodes the video data, video encoder 20 may generate a bitstream. The bitstream may include a sequence of bits that form a coded representation of the video data. The bitstream may include coded pictures and associated data. A coded picture is a coded representation of a picture. The associated data may include sequence parameter sets (SPSs), picture parameter sets (PPSs), and other syntax structures. A SPS may contain parameters applicable to zero or more sequences of pictures. A PPS may contain parameters applicable to zero or more pictures.

To generate an encoded representation of a picture, video encoder 20 may partition the picture into a grid of coding tree blocks (CTBs). In some instances, a CTB may be referred to as a "tree block", a "largest coding unit" (LCU) or a "coding tree unit." The CTBs of HEVC may be broadly analogous to the macroblocks of other standards, such as H.264/AVC. However, a CTB is not necessarily limited to a particular size and may include one or more coding units (CUs).

Each of the CTBs may be associated with a different equally-sized block of pixels within the picture. Each pixel may comprise a luminance (luma) sample and may also comprise two chrominance (chroma) samples. Thus, each CTB may be associated with a block of luminance samples and two blocks of chrominance samples. For ease of explanation, this disclosure may refer to a two-dimensional array of pixels as a pixel block and may refer to a two-dimensional array of samples as a sample block. Video encoder 20 may use quad-tree partitioning to partition the pixel block associated with a CTB into pixel blocks associated with CUs, hence the name "coding tree blocks."

The CTBs of a picture may be grouped into one or more slices. In some examples, each of the slices includes an integer number of CTBs. As part of encoding a picture, video encoder 20 may generate encoded representations of each slice of the picture (i.e., coded slices). To generate a coded slice, video encoder 20 may encode each CTB of the slice to generate encoded representations of each of the CTBs of the slice (i.e., coded CTBs).

To generate a coded CTB, video encoder 20 may recursively perform quad-tree partitioning on the pixel block associated with a CTB to divide the pixel block into progressively-smaller pixel blocks. Each of the smaller pixel blocks may be associated with a CU. A partitioned CU may be a CU whose pixel block is partitioned into pixel blocks associated with other CUs. A non-partitioned CU may be a CU whose pixel block is not partitioned into pixel blocks associated with other CUs.

Video encoder 20 may generate one or more prediction units (PUs) for each non-partitioned CU. Each of the PUs of a CU may be associated with a different pixel block within the pixel block of the CU. Video encoder 20 may generate predictive pixel blocks for each PU of the CU. The predictive pixel block of a PU may be a block of pixels.

Video encoder 20 may use intra prediction or inter prediction to generate the predictive pixel block for a PU. If video encoder 20 uses intra prediction to generate the predictive pixel block of a PU, video encoder 20 may generate the predictive pixel block of the PU based on decoded pixels of the picture associated with the PU. If video encoder 20 uses inter prediction to generate the predictive pixel block of the PU, video encoder 20 may generate the predictive pixel block of the PU based on decoded pixels of one or more pictures other than the picture associated with the PU.

After video encoder 20 generates predicted pixel blocks for one or more PUs of a CU, video encoder 20 may generate residual data for the CU based on the predicted pixel blocks for the PUs of the CU. The residual data for the CU may indicate differences between samples in the predicted pixel blocks for the PUs of the CU and the original pixel block of the CU.

Each pixel in the CU's residual pixel block may include a Y sample, a U sample, and a V sample. Thus, the CU's residual pixel block may comprise a Y residual sample block that includes the Y samples of the CU's residual pixel block, a U residual sample block that includes the U samples of the CU's residual pixel block, and a V residual sample block that includes the V samples of the CU's residual pixel block.

Furthermore, as part of performing an encoding operation on a non-partitioned CU, video encoder 20 may use quad-tree partitioning to decompose the CU into one or more transform units (TUs). Each of the TUs may be associated with a Y residual sample block, a U residual sample block, and a V residual sample block. The Y residual sample block associated with the TU may be a sub-block of the Y residual sample block of the CU. The U residual sample block may be a sub-block of the U residual sample block of the CU. The V residual sample block may be a sub-block of the V residual sample block of the CU.

Video encoder 20 may use a residual quad-tree (RQT) to signal how the CU is partitioned into TUs. In other words, video encoder 20 may include, in a bitstream, data that represent a RQT that indicates how the CU is partitioned into TUs. The RQT may comprise a hierarchy of nodes. Leaf nodes of the RQT may correspond to the TUs of the CU. Each node of the RQT may be associated with a split flag. If the split flag of a node is equal to 1, the node has four child nodes. If the split flag of a node is equal to 0, the node has no child nodes. A first node may be a child node of a second node if the first and second nodes are linked in the RQT and the first node is one level lower in the RQT than the second node. Levels of the RQT may be numbered from 0 upward, with level 0 corresponding to the root node, level 1 corresponding to child nodes of the root node, level 2 corresponding to grandchild nodes of the root node, and so on.

Figure 2A:
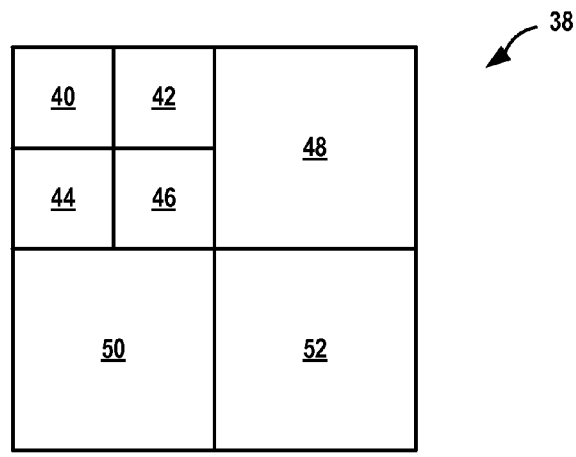
FIG. 2A is a conceptual diagram illustrating an example quad-tree decomposition of a residual pixel block associated with a coding unit (CU).

FIG. 2A is a conceptual diagram illustrating an example quad-tree decomposition of a residual pixel block 38 associated with a CU. In the example of FIG. 2A, residual pixel block 38 is partitioned into a top-left residual pixel block, a top-right residual pixel block, a lower-left residual pixel block, and a lower-right residual pixel block. The inner lines in FIG. 2A indicate one example outcome of transform block decomposition according to a quad-tree structure. This outcome is just one out of many possible decompositions. In the example of FIG. 2A, there are three levels of transform decompositions. At level 0 (i.e., depth 0), residual pixel block 38 is split into four quarter-sized blocks. Then, at level 1 (i.e., depth 1), the first quarter-sized transform block is further split into four 1/16-sized transform blocks (split=1). In other words, the top-left residual pixel block is further partitioned into four smaller residual pixel blocks, labeled 40, 42, 44, and 46. There is no further split for sub-blocks 40, 42, 44, and 46. In the example of FIG. 2A, the top-right residual pixel block is labeled 48, the lower-left residual pixel block is labeled 50, and the lower-right residual pixel block is labeled 52. There is no further split for sub-blocks 48, 50, and 52.

Figure 2B:
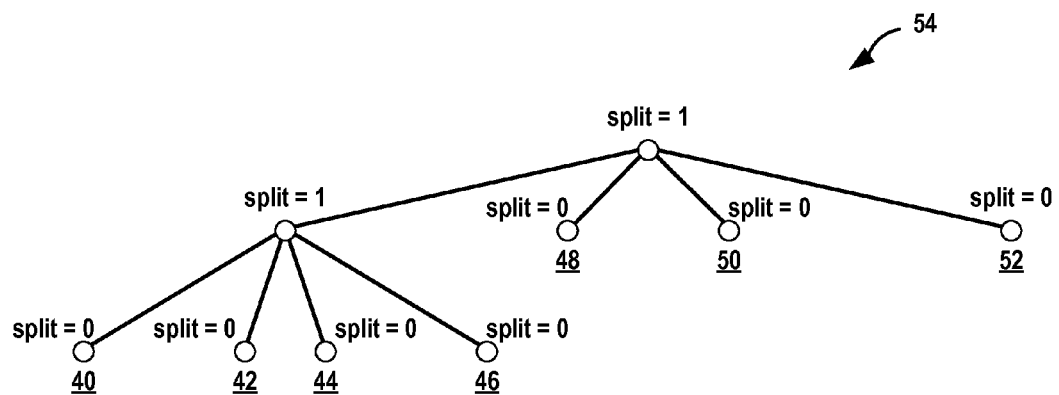
FIG. 2B is a conceptual diagram illustrating the transform decomposition scheme of FIG. 2A described using a tree.

FIG. 2B is a conceptual diagram illustrating a quad-tree decomposition scheme of FIG. 2A, described using a RQT 54. In the example of FIG. 2B, each circle corresponds to a node of RQT 54. Each node is associated with a split flag that indicates whether the residual pixel block associated with the node is split into four smaller residual pixel blocks. The leaf nodes of RQT 54 correspond to the labeled residual pixel blocks of FIG. 2A. In practice, the determination whether to split a transform block may be based on a rate-distortion optimization.

Video encoder 20 may perform transform operations on Y, U, and V residual sample blocks associated with TUs of a CU. When video encoder 20 performs the transform operation on a Y residual sample block, video encoder 20 may apply one or more transforms to the Y residual sample block to generate a Y coefficient block. When video encoder 20 performs the transform operation on a U residual sample block, video encoder 20 may apply one or more transforms to the U residual sample block to generate a U coefficient block. When video encoder 20 performs the transform operation on a V residual sample block, video encoder 20 may apply one or more transforms to the V residual sample block to generate a V coefficient block. Conceptually, a coefficient block may be a two-dimensional (2D) matrix of coefficients.

After generating a coefficient block, video encoder 20 may quantize the coefficient block. Quantization generally refers to a process in which coefficients are quantized to possibly reduce the amount of data used to represent the coefficients, providing further compression. After video encoder 20 quantizes a coefficient block, video encoder 20 may perform an entropy encoding operation on the coefficient block. For example, video encoder 20 may perform Context-Adaptive Binary Arithmetic Coding (CABAC) on data in the coefficient blocks.

When video encoder 20 performs a CABAC operation on a syntax element, the video encoder may convert the syntax element into a binary code. In other words, video encoder 20 may binarize the syntax element. In addition, video encoder 20 may select a coding context from among multiple available coding contexts. The coding context may indicate an expected probability of a "bin" of the binarized syntax element. A bin may be a single bit of the binarized syntax element. Video encoder 20 may use the selected coding context to generate a number that represents the syntax element. Video encoder 20 may output this number, along with other encoded syntax elements, in a bitstream. The bitstream may include an encoded version of the video data.

Video decoder 30 may receive the bitstream generated by video encoder 20. In addition, video decoder 30 may parse the bitstream to extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

Video decoder 30 may generate predicted pixel blocks for the PUs of a CU based at least in part on the syntax elements associated with the CU. In addition, video decoder 30 may inverse quantize coefficient blocks associated with TUs of the CU. Video decoder 30 may perform inverse transforms on the coefficient blocks to reconstruct residual sample blocks associated with the TUs of the CU. Video decoder 30 may reconstruct the pixel block of the CU based on the predicted pixel blocks and the residual pixel blocks.

In some instances, there may be no non-zero coefficients in a coefficient block. In other words, all of the coefficients in a coefficient block may be equal to zero. If there are no non-zero coefficients in a coefficient block, there may be no need for video encoder 20 to signal the values of the coefficients in the coefficient block. This disclosure may use the term "significant coefficient block" to refer to a coefficient block that includes at least one non-zero coefficient.

Accordingly, video encoder 20 may associate Y CBFs with the leaf nodes of the RQT for the CU. For each respective leaf node of the RQT, if the Y CBF of the respective leaf node is equal to 1, the Y coefficient block associated with the respective leaf node includes at least one non-zero coefficient. If the Y CBF of the respective leaf node is equal to 0, the Y coefficient block associated with the respective leaf node does not include any non-zero coefficients. The non-leaf nodes of the RQT are not associated with Y CBFs.

Video encoder 20 may encode the U CBFs and V CBFs in a hierarchical way. If the U CBF of a particular node is equal to 0 and the particular node is a leaf node, the particular node is not associated with a significant U coefficient block. If the U CBF of a particular node is equal to 0 and the particular node is not a leaf node, no descendant node of the particular node is associated with a significant U coefficient block. Because video decoder 30 may determine, based on the U CBF of the particular node being equal to 0 that no descendant node of the particular node is associated with a significant U coefficient block, it may be unnecessary for video encoder 20 to signal U CBFs for the descendant nodes of the particular node.

On the other hand, if the U CBF of a particular node is equal to 1 and the particular node is a leaf node, the particular node is associated with a significant U coefficient block. If the U CBF of a particular node is equal to 1 and the particular node is not a leaf node, at least one descendant node of the particular node is associated with a significant U coefficient block. Because at least one descendant node of the particular node is associated with a significant U coefficient block, each child node of the particular node may be associated with a U CBF.

If the V CBF of a particular node is equal to 0 and the particular node is a leaf node, the particular node is not associated with a significant V coefficient block. If the V CBF of a particular node is equal to 0 and the particular node is not a leaf node, no descendant node of the particular node is associated with a significant V coefficient block. Because video decoder 30 may determine, based on the V CBF of the particular node being equal to 0 that no descendant node of the particular node is associated with a significant V coefficient block, it may be unnecessary for video encoder 20 to signal V CBFs for the descendant nodes of the particular node.

On the other hand, if the V CBF of a particular node is equal to 1 and the particular node is a leaf node, the particular node is associated with a significant V coefficient block. If the V CBF of a particular node is equal to 1 and the particular node is not a leaf node, at least one descendant node of the particular node is associated with a significant V coefficient block. Because at least one descendant node of the particular node is associated with a significant V coefficient block, each child node of the particular node may be associated with a V CBF.

In some instances, a residual pixel block of a CU may be larger than a maximum-allowable TU size. For example, a residual pixel block of a CU may be 64×64 while the maximum-allowable TU size may be 32×32. When a residual pixel block of a CU is larger than the maximum-allowable TU size, video decoder 30 may automatically determine that the CU is partitioned into at least four TUs that are the maximum-allowable TU size or smaller. Because video decoder 30 may automatically determine that the CU is partitioned into at least four TUs, it may be unnecessary for video encoder 20 to associate a split flag with the root node of the CU's RQT. Moreover, video encoder 20 does not associate U CBFs or V CBFs with the root node of the CU's RQT.

Figure 3:
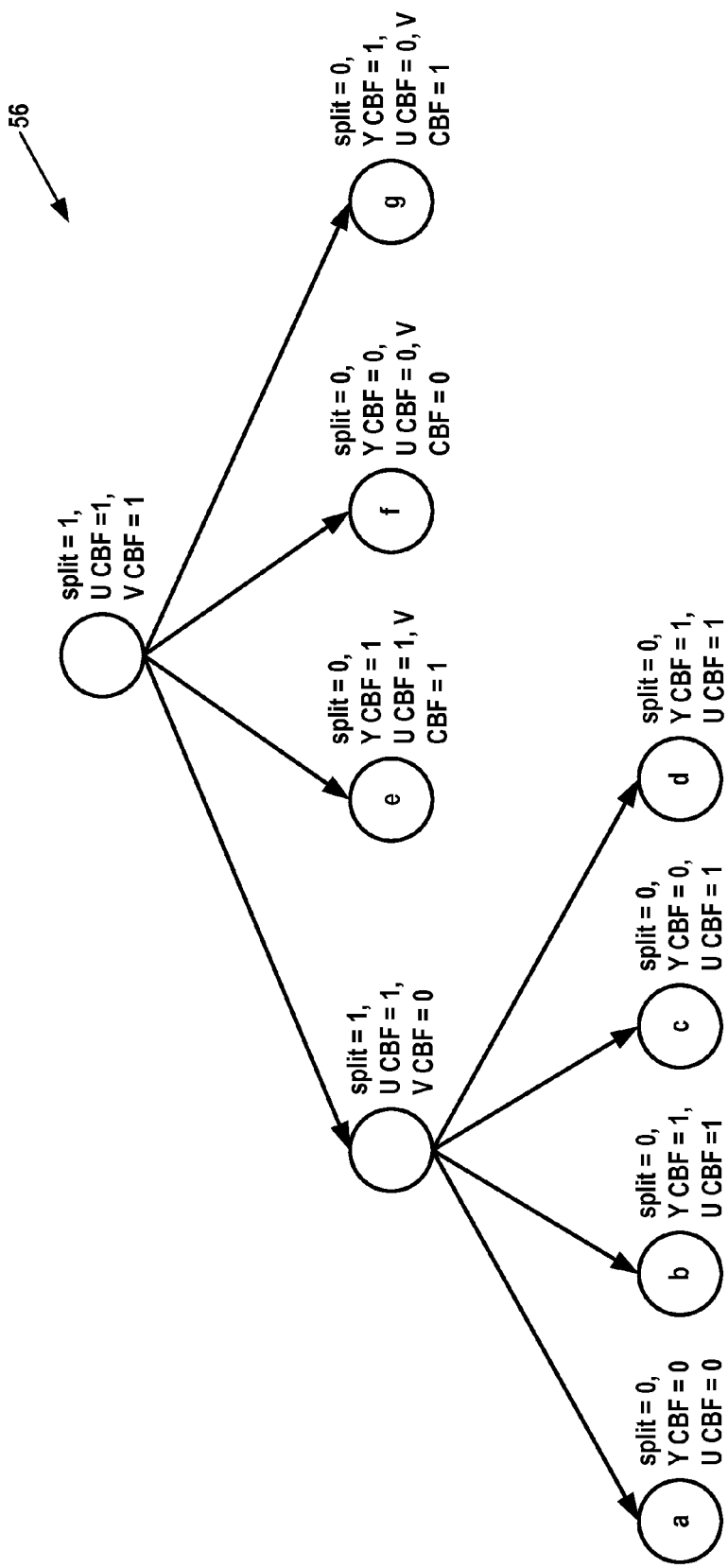
FIG. 3 is a conceptual diagram illustrating an example residual quad-tree (RQT).

FIG. 3 is a conceptual diagram that illustrates coding of an example residual quad-tree (RQT) 56. In this example of FIG. 3, each node of RQT 56 is represented as a circle. For each node (i.e., at each level), video encoder 20 encodes a split flag. In the example of FIG. 3, if a split flag is equal to 1, the node has four child nodes and the residual pixel block associated with the node is split into four evenly-sized residual pixel blocks (sub-blocks). If the split flag of a node is equal to 0, the node has no child nodes and the residual pixel block associated with the node is not split into smaller residual pixel blocks. Each node of RQT 56 may be associated with a U CBF and a V CBF, as described above. In other words, at each level, two other syntax elements may be transmitted. One is cbfU (coded block flag for U component) and the other one is cbfV (coded block flag for V component). These two syntax elements may be encoded in a hierarchical way. If cbfU=0, there is no non-zero U transform coefficient at current transform block (if it is not split) or all smaller transform blocks (if the current transform block is split into smaller blocks). In the latter case (i.e., the current transform block is further split), no cbfU may need to be transmitted for these further split blocks. The encoding process of cbfV may be the same.

If, for one block, the transmitted split flag has value 0, this block is a "leaf node" in the RQT. At the leaf node, Y CBF is transmitted, and U CBF and V CBF may also be transmitted (depending on the value of U CBF and V CBF at higher levels of the RQT, i.e., if higher level U CBF/V CBF is 0, then there may be no need to transmit at this lower level). As illustrated in the example of FIG. 3, each leaf node may be associated with a Y CBF. The Y CBF of a node indicates whether the node is associated with a significant Y coefficient block. Furthermore, if a leaf node is associated with significant Y, U, and/or V coefficient blocks, the leaf node may be associated with syntax elements that represent the significant Y, U, and/or V coefficient blocks. In other words, at the leaf node, the transform coefficients are encoded for Y, U, V components (CoeffY, CoeffU, CoeffV) if the corresponding flag (cbfY, cbfU, cbfV) is not zero.

In some cases, video decoder 30 may determine (i.e., infer) the value of a syntax element of a node from one or more already-decoded syntax elements at the same level of the RQT as the node or a higher level of the RQT higher than the level of the node. Determining the values of syntax elements in this way may increase coding efficiency. For example, if a U CBF (or a V CBF) of a node at level k is equal to 0, then video decoder 30 may determine that all U CBFs (or V CBFs) at level k+1 and all lower levels are equal to zero. In another example, if a node is associated with a residual pixel block that is larger than a maximum-allowable TU size, video decoder 30 may determine that the split flag of the node is equal to 1. In another example, video decoder 30 may determine that a split flag of a root node is equal to 1 if the CU associated with the root node is partitioned into four PUs and encoded using intra prediction (i.e., the CU is an intra N×N CU). In another example, video decoder 30 may determine that a split flag of a node is equal to 0 if the size of the residual pixel block associated with the node is equal to a minimum-allowable (minimum available) TU size. In another example, video decoder 30 may determine that a split flag of a node is equal to 0 if the depth in the RQT is equal to a maximum allowed depth for the size of the CU associated with the RQT. In another example, if the CU is inter predicted, video decoder 30 may determine that the Y CBF of a fourth (i.e., last) node at level k of the RQT is equal to 1 if the first three nodes (sub-blocks of a quarter-split block) at level k of the RQT all have Y CBF, U CBF, and V CBFs equal to 0. The maximum CU size and the maximum TU size may be decided by encoding parameters input to video encoder 20. Similarly, video decoder 30 may determine the maximum CU size and the maximum-allowable TU size based on encoding parameters input to video decoder 30. In some examples, the maximum-allowable CU size is larger than the maximum-allowable TU size.

Figure 4B:
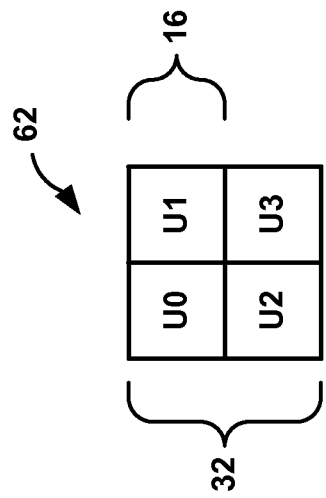
FIG. 4B is a conceptual diagram illustrating an example residual chroma sample block of a 64×64 CU.
Figure 4A:
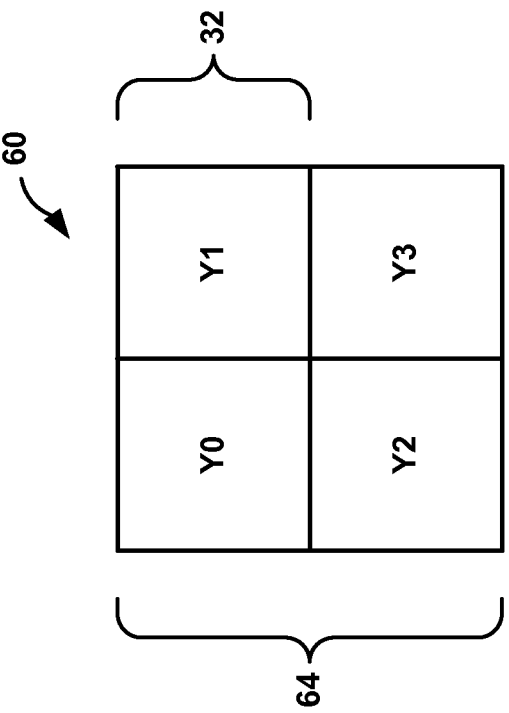
FIG. 4A is a conceptual diagram illustrating an example residual luma sample block of a 64×64 CU.

FIG. 4A is a conceptual diagram that illustrates an example residual luma (Y) sample block 60 of a 64×64 CU. FIG. 4B is a conceptual diagram that illustrates an example residual chroma sample block 62 of a 64×64 CU. Video encoder 20 may down-sample the chroma samples of a CU by a factor of 2:1, resulting in a residual chroma sample block for the CU that has half the width and half the height of the corresponding residual Y sample block for the same CU. Because the human visual system is less sensitive to changes in chrominance than to changes in luminance, such down-sampling does not necessarily reduce visual quality.

In the example of FIGS. 4A and 4B, the maximum CU size is assumed to be 64×64 and the maximum-allowable TU size is assumed to be 32×32. Because the CU is larger than the maximum-allowable TU size, video encoder 20 splits residual Y sample block 60 into four smaller residual sample blocks, Y0 . . . Y3. Although not shown in the examples of FIGS. 4A and 4B, video encoder 20 may split residual sample blocks Y0 . . . Y3 further.

Video encoder 20 may split chroma sample block 62 (of size 32×32) in the same manner as video encoder 20 splits the Y sample block. That is, the chroma block split with luma. For instance, if video encoder 20 splits a residual Y sample block into four smaller residual Y sample blocks, video encoder 20 also splits corresponding residual chroma sample blocks into four smaller residual chroma sample blocks. As shown in the example of FIG. 4A, video encoder 20 has split residual Y sample block 60 into four smaller residual Y sample blocks. Hence, in the example of FIG. 4B, video encoder 20 has split residual chroma sample block 62 into four smaller residual chroma sample blocks.

Because residual Y sample block 60 is larger than a maximum-allowable TU size, video encoder 20 is not associated with a U CBF or a V CBF of a root node of the RQT for the CU. In other words, encoding of chroma CBFs does not start from a CU root level (i.e., depth 0 of RQT). Instead, video encoder 20 may start associating U CBF and V CBFs with nodes at a level of the RQT that corresponds to maximum-allowable TU size. In other words, encoding of chroma CBFs starts from the level that corresponds to the maximum TU size. In the example of FIGS. 4A and 4B, residual Y sample block 60 is 64×64 and the maximum-allowable TU size is 32×32. Hence, level 1 of the RQT of the CU corresponds to the maximum-allowable TU size. As a result in the examples of FIGS. 4A and 4B, video encoder 20 may start encoding chroma CBFs (i.e., U CBFs and V CBFs) at nodes at level 1 of the RQT of the CU. As a result, video encoder 20 encodes a U CBF for U0 and the U CBFs of its sub-blocks (i.e., the sub-blocks of the top left quarter of the whole CU) in a hierarchical way, and then a U CBF for U1 and the U CBFs of its sub-blocks, and so on.

The implementation of video encoder 20 described above may use a different coding method for Y CBFs and chroma CBFs (i.e., U CBFs and V CBFs). Moreover, the implementation of video encoder 20 described above only applies hierarchical coding of chroma CBFs at some levels of the RQT. This may increase the complexity of video encoder 20.

The techniques of this disclosure may remedy these problems and improve CBF coding. In accordance with the techniques of this disclosure, signaling of chroma CBFs may start at the root node of the residual quad-tree associated with the current CU, even if the current CU is larger than a maximum-allowable TU size. The current CU may be the CU that is currently being encoded. Signaling chroma CBFs in this way may simplify the implementations of video encoder 20 and video decoder 30.

For example, in previous video codecs, like HEVC, the hierarchical coding of chroma CBFs starts from the largest allowable transforms, maxTransSize. If at level k, the block size is larger than maxTransSize, no chroma CBFs are encoded at level k. For example, the maximum-allowable TU size (maxTransSize) may be 32×32 and the size of the current CU may be 64×64. In this example, a video encoder may automatically split the block because the biggest transform size is smaller than the current block size and a video decoder may infer the split flag is equal to 1. Then, at the next level, i.e., 32×32 block, a chroma CBF (e.g., U CBF) is encoded for each 32×32 block. In accordance with the techniques of this disclosure, the encoding of chroma CBFs may always start from the root node of the CU's RQT (i.e., depth 0 of the RQT). For example, the maximum transform size is 32×32 and the current CU is 64×64. In this example, video encoder 20 may signal the value of a U CBF for the whole 64×64 CU (i.e., this signaling is corresponding to CU root level). In other words, the root node of the RQT (i.e., the node that corresponds to the 64×64 CU as a whole) may be associated with a U CBF that indicates whether any TU of the current CU is associated with a significant U coefficient block. CBFU=1 may specify that there is at least one non-zero coefficient in the sub-blocks, and CBFU may be transmitted for each of the four 32×32 sub-blocks. CBF U=0 may specify all the coefficients in the four sub-blocks are zero, and thus no may CBFU need to be transmitted. The same can be applied to CBFV. That is, the root node of the RQT may be associated with a V CBF that indicates whether any TU of the current CU is associated with a significant V coefficient block.

Because U CBFs or V CBFs are signaled in a hierarchical manner for each respective node in the RQT, the respective node does not include a U CBF unless the respective node is the root node or a U CBF of a parent node of the respective node indicates that a descendant node of the parent node is associated with a significant U chroma block. The respective node does not include a V CBF unless the respective node is the root node or a V CBF of the parent node of the respective node indicates that a descendant node of the parent node is associated with a significant V chroma block.

Thus, in accordance with the techniques of this disclosure, for each respective node of the RQT, if the respective node has a CBF for a particular chroma component and the CBF for the particular chroma component has a first value, the respective node or a descendant node of the respective node is associated with a significant coefficient block that is based on samples of the particular chroma component. As indicated above, this disclosure may use the term "significant coefficient block" to refer to a coefficient block that includes at least one non-zero coefficient. If the respective node has a CBF for the particular chroma component and the CBF for the particular chroma component has a second value, neither a TU that corresponds to the respective node nor any TU that corresponds to any descendant node of the respective node is associated with a significant coefficient block that is based on samples of the particular chroma component. If the respective node has a CBF for the particular chroma component and the CBF for the particular chroma component has the second value, no descendant node of the respective node is associated with a CBF for the particular chroma component.

In some existing video codecs, like HEVC, chroma CBFs (i.e., CBF Us and CBF Vs) are encoded in a hierarchical way and luma CBFs (i.e., Y CBFs) are encoded at only leaf nodes. In contrast, in accordance with the techniques of this disclosure, Y CBFs may be signaled, at each level, in a hierarchical way, similar to U and V CBFs. For instance video encoder 20 may, at each level, signal a U CBF and a V CBF. If the U CBF is at level 0 (i.e., the level of the root node within the RQT of the current block), there are no non-zero coefficients in U coefficient blocks of the current block or further split blocks of the current block, and thus no more U CBFs may need to be transmitted for the further split blocks. The same is applied to V CBFs. Furthermore, video encoder 20 may signal Y CBFs in the same hierarchical way as U and V CBFs. In this way, coding of CBFs for luma and chroma may be unified. That is, for each respective node of an RQT, if the Y CBF of the respective node is equal to 1, a Y coefficient block associated with the respective node or a Y coefficient block associated with a descendant node of the respective node includes at least one non-zero coefficient. If the Y CBF of the respective node is equal to 0, the respective node is not associated with a significant Y coefficient block or none of the descendant nodes of the respective nodes is associated with a significant Y coefficient block. If the Y CBF of the respective node is equal to 0, none of the descendant nodes of the respective node is associated with a Y CBF. In other words, if the Y CBF of the respective node is equal to 0, video encoder 20 does not signal Y CBFs for any descendant nodes (i.e., split blocks) of the respective node. Thus, the nodes may be associated with Y CBFs in a manner similar to that for U and V CBFs. The techniques of this disclosure described above relating to signaling chroma CBFs at a root node of an RQT may also be applied to Y CBFs.

In some examples, video encoder 20 may signal a residual flag (e.g., "cbf_root_flag") at a root node of a CU's RQT. If the residual flag is equal to 0, video decoder 30 may automatically determine (e.g., infer) that none of the Y, U, or V coefficient blocks associated with the CU are significant (i.e., all Y, U, and V coefficients are 0). If the residual flag is equal to 1, at least one Y, U, or V coefficient block associated with the CU is significant. Moreover, if the residual flag is equal to 1 and the U CBF and the V CBF of the root node are equal to 0, video decoder 30 may automatically determine (e.g., infer) that there is at least one significant Y coefficient block associated with the CU. In other words, video decoder 30 may infer a value of 1 for Y CBF in this case. Accordingly, in some examples, if the residual flag is equal to 1 and both the U CBF and the V CBF of the root node are equal to 0, video encoder 20 does not signal the Y CBF for the root node.

For any node of an RQT at each level of the RQT, if the Y CBF, U CBF, and V CBF of the node are all equal to 0, video decoder 30 may automatically determine (i.e., infer) that the node does not have any child nodes. In other words, if the Y CBF, U CBF, and V CBF of the node are all equal to 0, video decoder 30 may infer the value 0 for the split flag of the node. Accordingly, if the Y CBF, U CBF, and V CBF of a node are all equal to 0, video encoder 20 does not signal the split flag of the node.

Furthermore, video encoder 20 may perform CABAC encoding on the split flags of the nodes. To perform CABAC encoding on a split flag, video encoder 20 may select a coding context for the split flag and then use the coding context to CABAC encode the split flag. In accordance with the techniques of this disclosure, video encoder 20 may select the coding context for the split flag of a node based at least in part on the values of the Y CBF, U CBF, and/or V CBFs of the node. In another example, if a Y CBF is equal to 0, a video coder (e.g., video encoder 20 or video decoder 30) may select a first coding context to encode the split flag. In this example, if a Y CBF is equal to 1, the video coder may use a second coding context to encode the split flag. In another example, the video coder may select the coding context for the split flag based on whether the CU is intra predicted or inter predicted. In this example, the video coder may determine a context index of a coding context for coding the split flag by calculating Y CBF+2*blocktype, where blocktype is equal to 0 for an intra predicted CU and blockType is equal to 1 for an inter predicted CU.

A video coder (e.g., video encoder 20 or video decoder 30) may perform CABAC on the Y CBF, U CBF and V CBF of a node of a RQT. In accordance with the techniques of this disclosure, the video coder may, in some examples, use the same coding context when performing CABAC on the Y CBF, U CBF, and V CBF of a node. Using the same coding context when performing CABAC on the Y CBF, U CBF, and V CBF of a node may simplify the CABAC process and may accelerate video coding. In some examples, the video coder may select the coding context based on a depth of the node of the RQT. For instance, the video coder may select a first coding context if the node is at level 0 of the RQT, a second coding context if the node is at level 1 of the RQT, and so on. In such examples, the video coder may use the following equation to determine a context index ctx_idx that identifies a coding context:

ctx_idx=transform_depth

In other examples, the video coder may select the coding context based on whether the node is the root node of the RQT. For instance, the video coder may use the following equation to determine a context index ctx_idx that identifies a coding context:

ctx_idx=transform_depth==0?0:1

Figure 5:
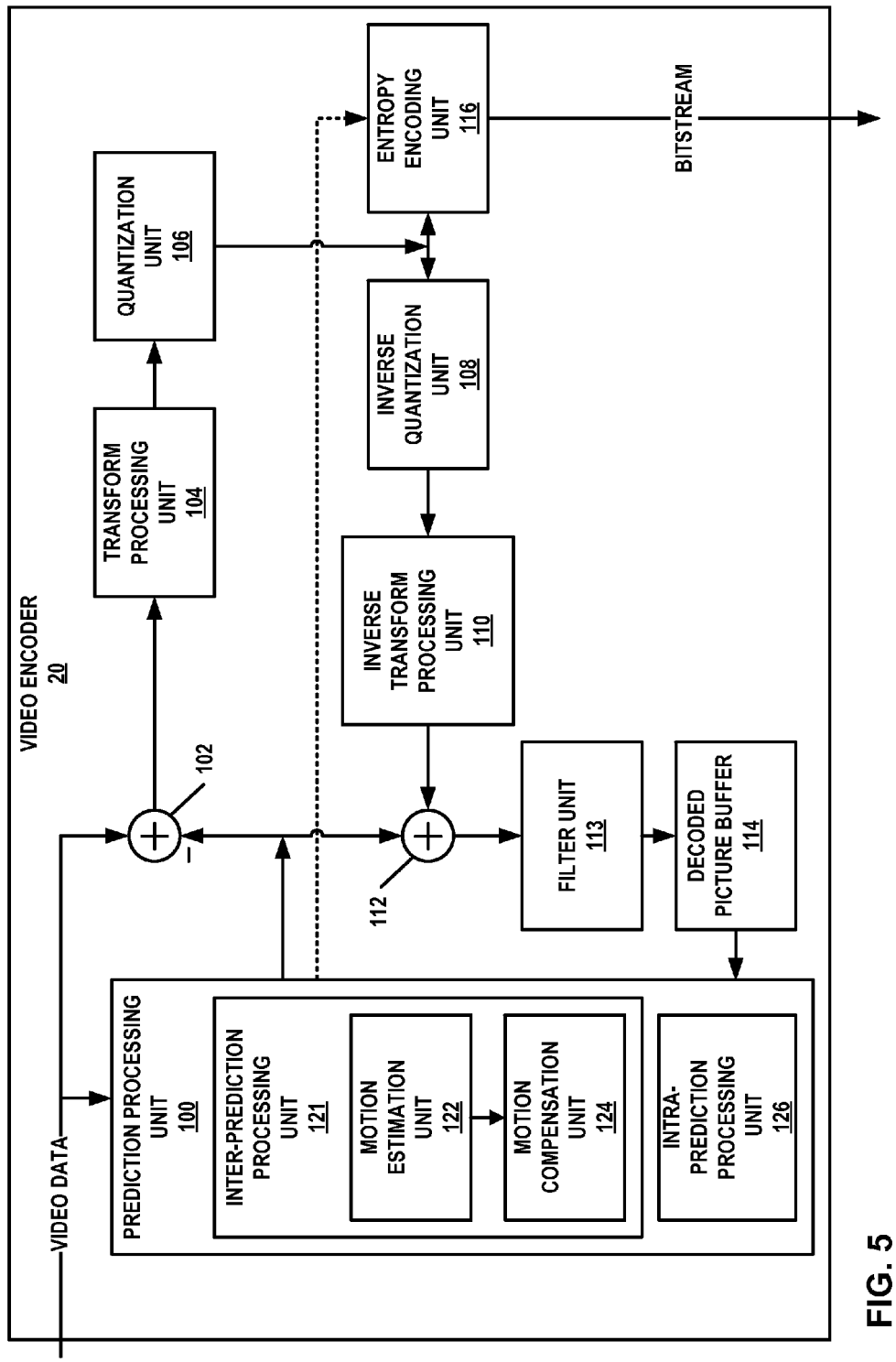
FIG. 5 is a block diagram illustrating an example video encoder that may implement the techniques of this disclosure.

FIG. 5 is a block diagram that illustrates an example video encoder 20 that is configured to implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 5, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. Prediction processing unit 100 includes an inter-prediction processing unit 121 and an intra-prediction processing unit 126. Inter-prediction processing unit 121 includes a motion estimation unit 122 and a motion compensation unit 124. In other examples, video encoder 20 may include more, fewer, or different functional components.

Video encoder 20 may receive video data. To encode the video data, video encoder 20 may encode each slice of each picture of the video data. As part of encoding a slice, video encoder 20 may encode each CTB in the slice. As part of encoding a CTB, prediction processing unit 100 may perform quad-tree partitioning on the pixel block associated with the CTB to divide the pixel block into progressively-smaller pixel blocks. The smaller pixel blocks may be associated with CUs. For example, prediction processing unit 100 may partition the pixel block of a CTB into four equally-sized sub-blocks, partition one or more of the sub-blocks into four equally-sized sub-sub-blocks, and so on.

Video encoder 20 may encode CUs of a CTB to generate encoded representations of the CUs (i.e., coded CUs). As part of encoding a CU, prediction processing unit 100 may partition the pixel block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 121 may generate predictive data for a PU by performing inter prediction on each PU of a CU. The predictive data for the PU may include a predictive pixel block that corresponds to the PU and motion information for the PU. Slices may be I slices, P slices, or B slices. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU.

If a PU is in a P slice, motion estimation unit 122 may search the reference pictures in a list of reference pictures (e.g., "list 0") for a reference block for the PU. The reference block of the PU may be a pixel block that most closely corresponds to the pixel block of the PU. Motion estimation unit 122 may generate a reference picture index that indicates the reference picture in list 0 containing the reference block of the PU and a motion vector that indicates a spatial displacement between the pixel block of the PU and the reference block. Motion estimation unit 122 may output the reference picture index and the motion vector as the motion information of the PU. Motion compensation unit 124 may generate the predictive pixel block of the PU based on the reference block indicated by the motion information of the PU.

If a PU is in a B slice, motion estimation unit 122 may perform uni-directional inter prediction or bi-directional inter prediction for the PU. To perform uni-directional inter prediction for the PU, motion estimation unit 122 may search the reference pictures of a first reference picture list ("list 0") or a second reference picture list ("list 1") for a reference block for the PU. Motion estimation unit 122 may output, as the motion information of the PU, a reference picture index that indicates a position in list 0 or list 1 of the reference picture that contains the reference block, a motion vector that indicates a spatial displacement between the pixel block of the PU and the reference block, and a prediction direction indicator that indicates whether the reference picture is in list 0 or list 1.

To perform bi-directional inter prediction for a PU, motion estimation unit 122 may search the reference pictures in list 0 for a reference block for the PU and may also search the reference pictures in list 1 for another reference block for the PU. Motion estimation unit 122 may generate reference picture indexes that indicate positions in list 0 and list 1 of the reference pictures that contain the reference blocks. In addition, motion estimation unit 122 may generate motion vectors that indicate spatial displacements between the reference blocks and the pixel block of the PU. The motion information of the PU may include the reference picture indexes and the motion vectors of the PU. Motion compensation unit 124 may generate the predictive pixel block of the PU based on the reference blocks indicated by the motion information of the PU.

Intra-prediction processing unit 126 may generate predictive data for a PU by performing intra prediction on the PU. The predictive data for the PU may include a predictive pixel block for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTBs. Intra-prediction processing unit 126 may use various numbers of intra prediction modes, e.g., 33 directional intra prediction modes. In some examples, the number of intra prediction modes may depend on the size of the pixel block of the PU.

Prediction processing unit 100 may select the predictive data for PUs of a CU from among the predictive data generated by inter-prediction processing unit 121 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive pixel blocks of the selected predictive data may be referred to herein as the selected predictive pixel blocks.

Residual generation unit 102 may generate, based on the pixel block of a CU and the selected predictive pixel blocks of the PUs of the CU, a residual pixel block of a CU. For instance, residual generation unit 102 may generate the residual pixel block of the CU such that each sample in the residual pixel block has a value equal to a difference between a sample in the pixel block of the CU and a corresponding sample in a selected predictive pixel block of a PU of the CU.

Transform processing unit 104 may perform quad-tree partitioning to partition the residual pixel block of a CU into sub-blocks. Each undivided residual pixel block may be associated with a different TU of the CU. The sizes and positions of the residual pixel blocks associated with TUs of a CU may or may not be based on the sizes and positions of pixel blocks associated with the PUs of the CU. A quad-tree structure known as a "residual quad-tree" (RQT) may include nodes associated with each of the residual pixel blocks. The TUs of a CU may correspond to leaf nodes of the RQT.

Because the pixels of the residual pixel blocks of the TUs may comprise a Y sample, a U sample, and a V sample, each of the TUs may be associated with a block of Y samples, a block of U samples, and a block of V samples. Transform processing unit 104 may generate coefficient blocks for each TU of a CU by applying one or more transforms to the residual sample blocks associated with the TU. Transform processing unit 104 may apply various transforms to a residual sample block associated with a TU. For example, transform processing unit 104 may apply a discrete cosine transform (DCT), a directional transform, or a conceptually similar transform to a residual sample block.

In accordance with the techniques of this disclosure, transform processing unit 104 may generate data that represents of an RQT for a CU. The RQT may include a hierarchy of nodes. The root node of the RQT may be associated with a U CBF and a V CBF, regardless of whether the residual pixel block of the CU is larger than a maximum-allowable TU size. Furthermore, in some examples, any node of the RQT may be associated with a Y CBF.

Transform processing unit 104 may determine a transform to apply based on a size of the residual sample block to which the transform is to be applied. For example, transform processing unit 104 may apply different transforms dependent on whether the residual sample block is 4×4, 8×8, 16×16, or another size. In some examples, transform processing unit 104 may apply transforms to rectangular-shaped residual sample blocks, such as residual samples blocks that are 16×4, 32×8, and so on.

Quantization unit 106 may quantize the coefficients in a coefficient block associated with a TU. The quantization process may reduce the bit depth associated with some or all of the coefficients. For example, an n-bit coefficient may be rounded down to an m-bit coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU.

Inverse quantization unit 108 and inverse transform processing unit 110 may apply inverse quantization and inverse transforms to a coefficient block, respectively, to reconstruct a residual sample block from the coefficient block. Reconstruction unit 112 may add the reconstructed residual sample block to corresponding samples from one or more predictive sample blocks generated by prediction processing unit 100 to produce a reconstructed sample block associated with a TU. By reconstructing sample blocks for each TU of a CU in this way, video encoder 20 may reconstruct the pixel block of the CU.

Filter unit 113 may perform a deblocking operation to reduce blocking artifacts in the pixel block associated with a CU. Decoded picture buffer 114 may store the reconstructed pixel blocks after filter unit 113 performs the one or more deblocking operations on the reconstructed pixel blocks. Inter-prediction unit 121 may use a reference picture that contains the reconstructed pixel blocks to perform inter prediction on PUs of other pictures. In addition, intra-prediction processing unit 126 may use reconstructed pixel blocks in decoded picture buffer 114 to perform intra prediction on other PUs in the same picture as the CU.

Entropy encoding unit 116 may receive data from other functional components of video encoder 20. For example, entropy encoding unit 116 may receive coefficient blocks from quantization unit 106 and may receive syntax elements from prediction processing unit 100. Entropy encoding unit 116 may perform one or more entropy encoding operations on the data to generate entropy-encoded data. For example, entropy encoding unit 116 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 116. For instance, the bitstream may include data that represents a RQT for a CU.

Figure 6:
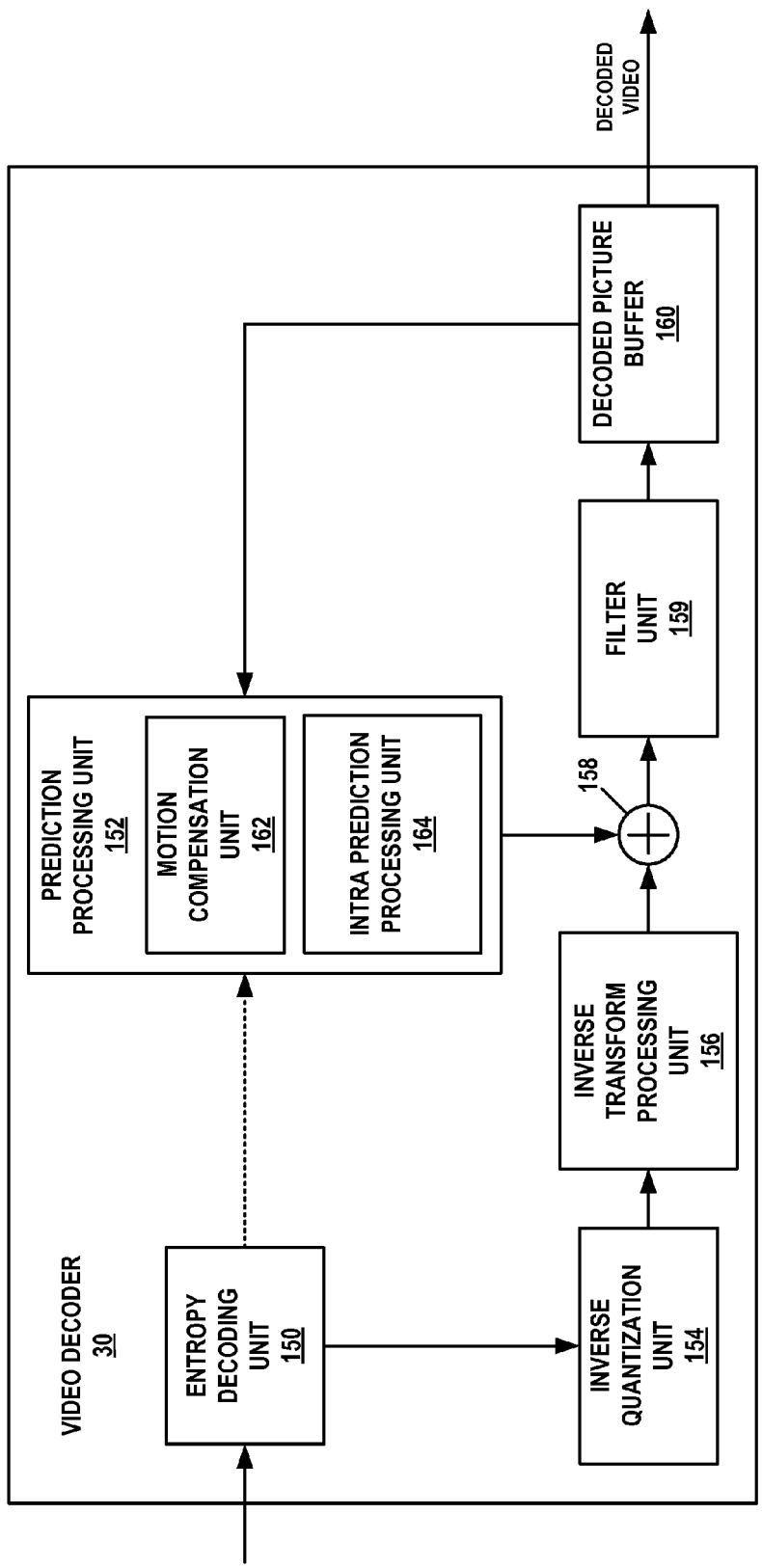
FIG. 6 is a block diagram illustrating an example video decoder that may implement the techniques of this disclosure.

FIG. 6 is a block diagram illustrating an example video decoder 30 that is configured to implement the techniques of this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 6, video decoder 30 includes an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra-prediction processing unit 164. In other examples, video decoder 30 may include more, fewer, or different functional components.

Video decoder 30 may receive a bitstream. Entropy decoding unit 150 may parse the bitstream to extract syntax elements from the bitstream. As part of parsing the bitstream, entropy decoding unit 150 may entropy decode entropy-encoded syntax elements in the bitstream. Prediction processing unit 152, inverse quantization unit 154, inverse transform processing unit 156, reconstruction unit 158, and filter unit 159 may generate decoded video data based on the syntax elements extracted from the bitstream.

The bitstream may comprise a series of NAL units. The NAL units of the bitstream may include coded slice NAL units. As part of parsing the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In accordance with the techniques of this disclosure, entropy decoding unit 150 may parse, from the bitstream, a CBF of a root node of a RQT of a CU, regardless of whether a residual pixel block of the CU is larger than a maximum-allowable TU size. Furthermore, if the CBF has a first value, entropy decoding unit 150 may parse, from the bitstream, a chroma coefficient block (e.g., a U coefficient block or a V coefficient block) associated with a leaf node of the RQT. If the CBF has a second value that is different than the first value, entropy decoding unit 150 does not parse the chroma coefficient block from the bitstream.

In addition, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual pixel block associated with the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual sample block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 164 may perform intra prediction to generate a predictive sample block for the PU. Intra-prediction processing unit 164 may use an intra prediction mode to generate the predictive pixel block for the PU based on the pixel blocks of spatially-neighboring PUs. Intra-prediction processing unit 164 may determine the intra prediction mode for the PU based on one or more syntax elements parsed from the bitstream.

Motion compensation unit 162 may construct a first reference picture list (list 0) and a second reference picture list (list 1) based on syntax elements extracted from the bitstream. Furthermore, if a PU is encoded using inter prediction, entropy decoding unit 150 may extract motion information for the PU. Motion compensation unit 162 may determine, based on the motion information of the PU, one or more reference blocks for the PU. Motion compensation unit 162 may generate, based on the one or more reference blocks for the PU, a predictive pixel block for the PU.

Reconstruction unit 158 may use the residual pixel blocks associated with TUs of a CU and the predictive pixel blocks of the PUs of the CU, i.e., either intra-prediction data or inter-prediction data, as applicable, to reconstruct the pixel block of the CU. In particular, reconstruction unit 158 may add samples of the residual pixel blocks to corresponding samples of the predictive pixel blocks to reconstruct the pixel block of the CU.

Filter unit 159 may perform a deblocking operation to reduce blocking artifacts associated with the pixel block of the CU. Video decoder 30 may store the pixel block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the pixel blocks in decoded picture buffer 160, intra prediction or inter prediction operations on PUs of other CUs.

Figure 7:
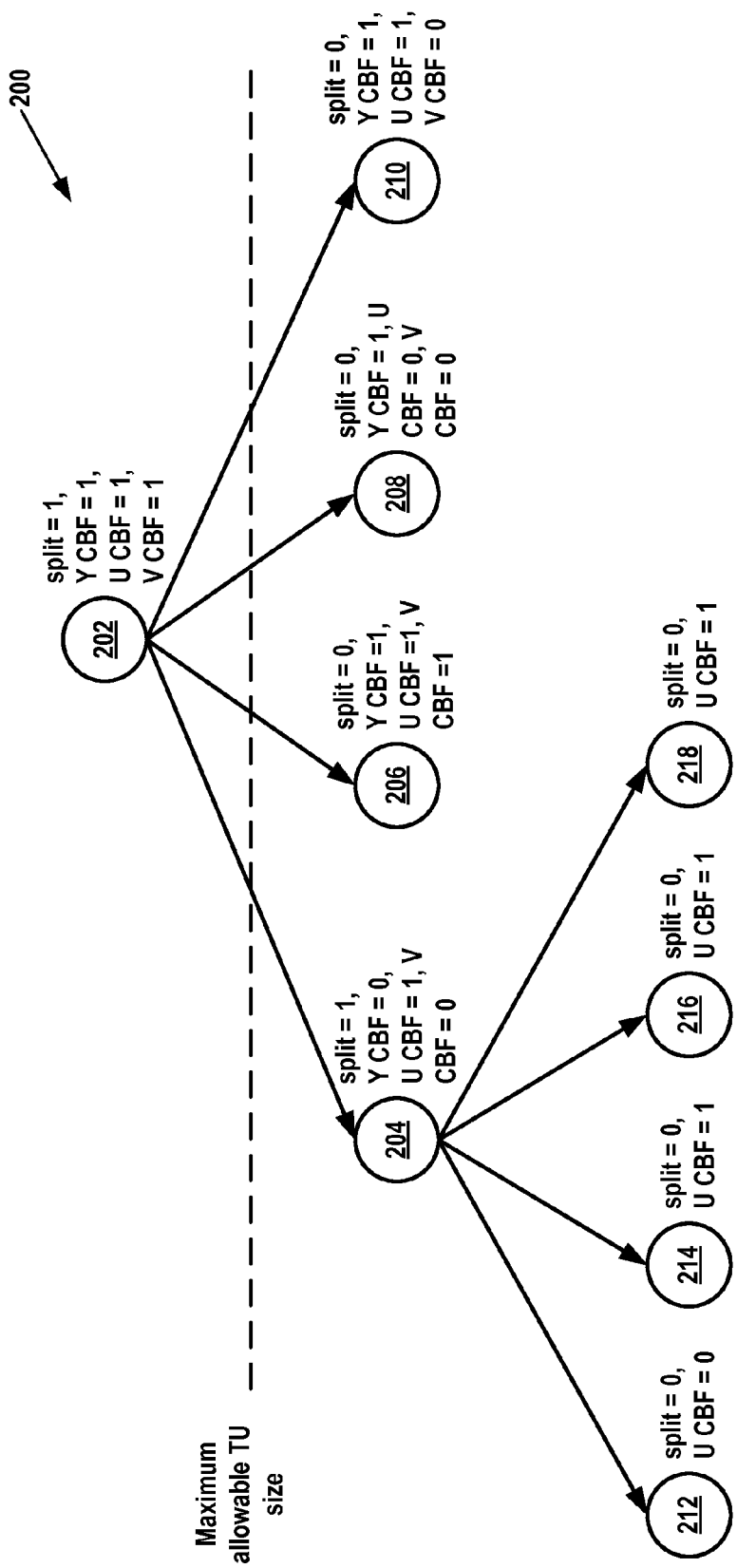
FIG. 7 is a conceptual diagram illustrating an example residual quad tree (RQT), in accordance with one or more techniques of this disclosure.

FIG. 7 is a conceptual diagram illustrating an example RQT 200, in accordance with one or more techniques of this disclosure. RQT 200 includes nodes 202-218. Node 202 is a root node of RQT 200. Node 202 may correspond to a CU. Nodes 204-210 are at a second level (level 1) of RQT 200 and nodes 212-218 are at a third level (level 2) of RQT 200. Nodes 206, 208, 210, 212, 214, 216, and 218 are leaf nodes of RQT 200 and, consequently, may be TUs of the CU. As indicated by the dashed line in the example of FIG. 7, the residual pixel block associated with root node 202 may be larger than a maximum-allowable TU size.

In accordance with the techniques of this disclosure, video encoder 20 may generate a bitstream that includes, for root node 202, a split flag, a Y CBF, a U CBF, and a V CBF. As illustrated in the example of FIG. 7, the split flag, the Y CBF, the U CBF, and the V CBF are each equal to 1. Because the Y CBF, the U CBF, and the V CBF of root node 202 are each equal to 1, each child node of root node 202 (i.e., nodes 204, 206, 208, and 210) is associated with a split flag, a Y CBF, a U CBF, and a V CBF. In the example of FIG. 7, the Y CBF and the V CBF of node 204 are both equal to 0. Hence, the child nodes of node 204 (i.e., nodes 212, 214, 216, and 218) are not associated with significant Y coefficient blocks or significant V coefficient blocks and are not associated with Y CBFs or V CBFs.

Figure 8:
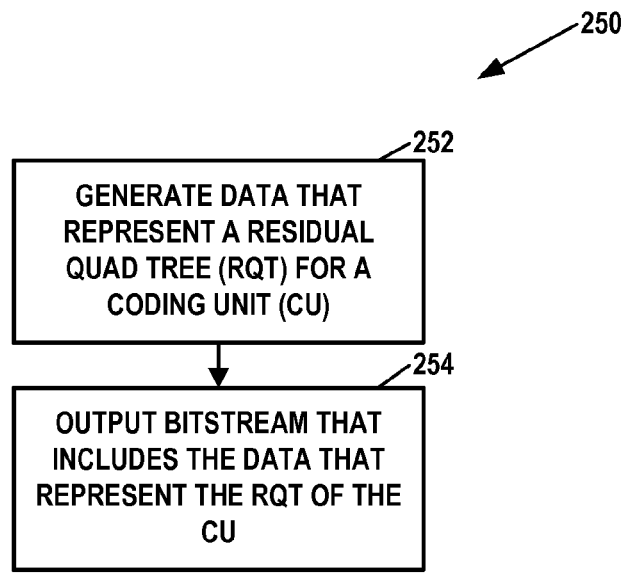
FIG. 8 is a flowchart illustrating an example operation of a video encoder, in accordance with one or more techniques of this disclosure.

FIG. 8 is a flowchart illustrating an example operation 250 of video encoder 20, in accordance with the techniques of this disclosure. The flowchart of FIG. 8 and the flowcharts of the following figures are provided as examples. In other examples, the flowcharts may include more, fewer, or different steps.

In the example of FIG. 8, video encoder 20 generates data that represent a RQT for a CU (252). The CU is larger than a maximum-allowable TU size. The RQT includes a hierarchy of nodes. A root node of the RQT corresponds to the CU as a whole and leaf nodes of the RQT correspond to TUs of the CU. The root node is associated with a CBF for a particular chroma component, e.g., U or V. The CBF for the particular chroma component indicates whether any of the TUs of the CU are associated with a significant chroma coefficient block. Video encoder 20 outputs a bitstream that includes the data that represent the RQT for the CU (254).

Figure 9:
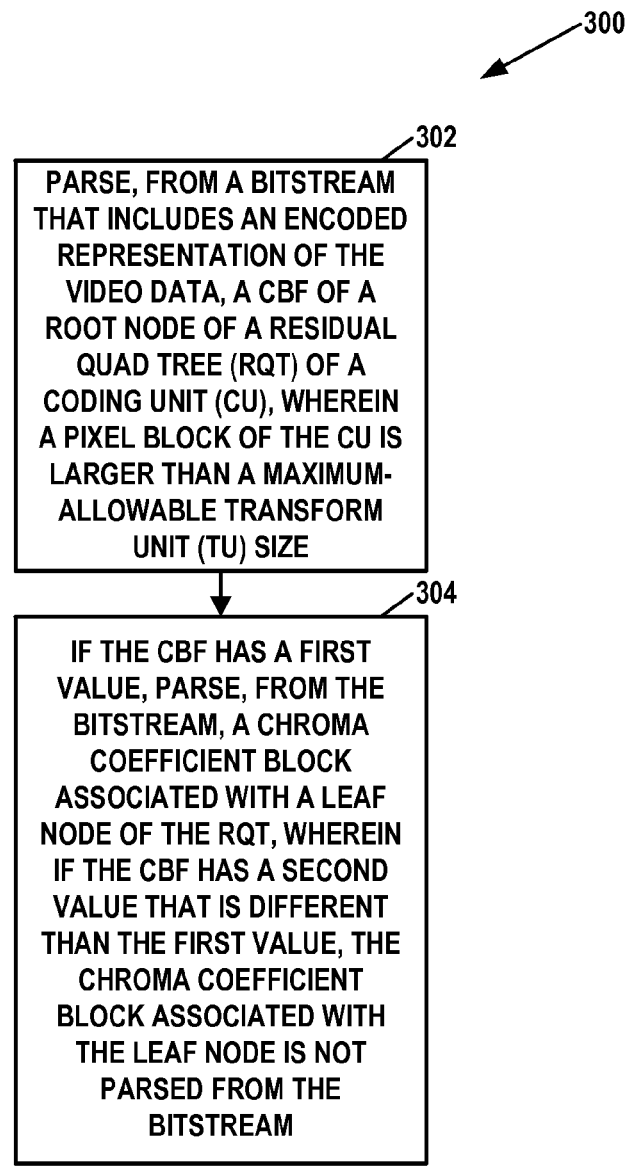
FIG. 9 is a flowchart illustrating an example operation of a video decoder, in accordance with one or more techniques of this disclosure.

FIG. 9 is a flowchart illustrating an example operation 300 of video decoder 30, in accordance with the techniques of this disclosure. In the example of FIG. 9, video decoder 30 parses, from a bitstream that includes an encoded representation of the video data, a CBF of a root node of a RQT of a CU (302). A pixel block of the CU is larger than a maximum-allowable transform unit (TU) size. If the CBF has a first value, video decoder 30 may parse, from the bitstream, a chroma coefficient block associated with a leaf node of the RQT (304). If the CBF has a second value that is different than the first value, the chroma coefficient block associated with the leaf node is not parsed from the bitstream.

Figure 10A:
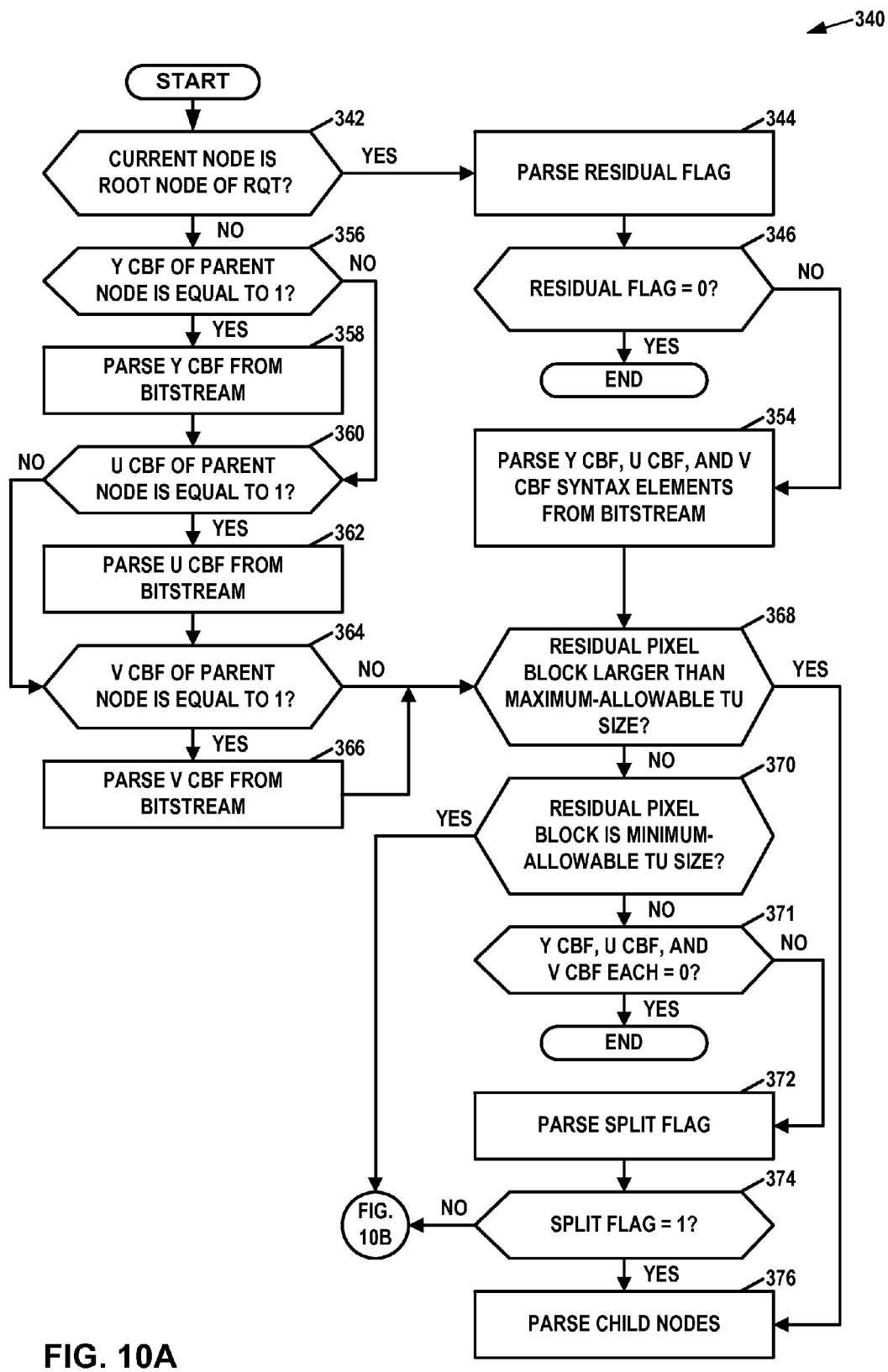
FIG. 10A is a flowchart illustrating an example operation to parse syntax elements of a node of a RQT, in accordance with one or more techniques of this disclosure.

FIG. 10A is a flowchart illustrating an example operation 340 to parse syntax elements of a node of a RQT, in accordance with the techniques of this disclosure. Operation 340 may be an expanded version of operation 300 of FIG. 9. In the example of FIG. 10, entropy decoding unit 150 of video decoder 30 may determine whether a current node of the RQT is the root node of the RQT (342). In some examples, entropy decoding unit 150 may determine that the current node is the root node if the depth of the current node of the RQT is equal to 0.

In response to determining that the current node is the root node of the RQT ("YES" of 342), entropy decoding unit 150 may parse a residual flag from the bitstream (344). The residual flag may indicate whether there is a leaf node of the RQT that is associated with a significant coefficient block. If the residual flag indicates that no leaf node of the RQT is associated with a significant coefficient block, no node of the RQT is associated with a CBF. After parsing the residual flag, entropy decoding unit 150 may determine whether the residual flag is equal to 0 (346).

In response to determining that the residual flag is equal to 0 ("YES" of 346), entropy decoding unit 150 may have finished parsing the syntax elements of the current node of the RQT. On the other hand, in response to determining that the residual flag is equal to 1 ("NO" of 346), entropy decoding unit 150 may parse Y CBFs, U CBFs, and V CBFs of the current node from the bitstream (354). The Y CBF of the root node may indicate whether any leaf node of the RQT is associated with a significant luma coefficient block.

In response to determining that the current node is not the root node of the RQT ("NO" of 342), entropy decoding unit 150 may determine whether a Y CBF of the current node's parent node is equal to 1 (356). If the current node's parent node does not have a Y CBF, entropy decoding unit 150 may determine that the Y CBF of the current node's parent node is equal to 0. In response to determining that the Y CBF of the current node's parent node is equal to 1 ("YES" of 356), entropy decoding unit 150 may parse a Y CBF from the bitstream (358). Thus, the root node is associated with a Y CBF that indicates whether any of the TUs of the CU are associated with a significant luma coefficient block. In other words, the Y CBF may indicate whether any TU that corresponds to the current node or a descendant node of the current node is associated with a significant Y coefficient block.

After parsing the Y CBF or after determining that the Y CBF of the current node's parent node is not equal to 1 ("NO" of 356), entropy decoding unit 150 may determine whether a U CBF of the current node's parent node is equal to 1 (360). If the current node's parent node does not have a U CBF, entropy decoding unit 150 may determine that the U CBF of the current node's parent node is equal to 0. In response to determining that the U CBF of the current node's parent node is equal to 1 ("YES" of 360), entropy decoding unit 150 may parse a U CBF from the bitstream (362). The U CBF may indicate whether the current node or any descendant node of the current node is associated with a significant U coefficient block.

After parsing the U CBF or after determining that the U CBF of the current node's parent node is not equal to 1 ("NO" of 360), entropy decoding unit 150 may determine whether a V CBF of the current node's parent node is equal to 1 (364). If the current node's parent node does not have a V CBF, entropy decoding unit 150 may determine that the V CBF of the current node's parent node is equal to 0. In response to determining that the V CBF of the current node's parent node is equal to 1 ("YES" of 364), entropy decoding unit 150 may parse a V CBF from the bitstream (366). The V CBF may indicate whether the current node or a descendant node of the current node is associated with a significant V coefficient block.

As mentioned above, entropy decoding unit 150 may perform CABAC when parsing some syntax elements from the bitstream. In some examples, video encoder 20 may perform, based on a same coding context, CABAC encoding on the Y CBF, U CBF, and V CBF of the current node of the RQT. In such examples, when entropy decoding unit 150 parses the Y CBF, U CBF, and V CBF, entropy decoding unit 150 may perform, based on the same coding context, CABAC decoding on the Y CBF, U CBF, and V CBF of the current node of the RQT.

Furthermore, in some examples, video encoder 20 may select, based on depths of nodes of the RQT, coding contexts for Y CBFs, U CBFs, and V CBFs specified by the nodes of the RQT. In some examples, an index value of the selected coding context is equal to a depth of a node of the RQT. For instance, if the depth of a node is 2, the index value of the selected coding context is equal to 2. Video encoder 20 may perform, based on the coding contexts selected for the Y, U, and V CBFs, entropy encoding operations on the Y, U, and V CBFs. Likewise, when entropy decoding unit 150 parses the Y, U, and V CBFs, entropy decoding unit 150 may select, based on depths of the nodes of the RQT, coding contexts for Y, U, and V CBFs specified by the nodes of the RQT. Entropy decoding unit 150 may perform, based on the coding contexts selected for the Y, U, and V CBFs, entropy decoding operations on the Y, U, and V CBFs.

After parsing the V CBF, after determining that the V CBF of the current node's parent node is not equal to 1 ("NO" of 364), or after parsing the Y CBFs, U CBFs, and V CBFs in action 354, entropy decoding unit 150 may determine whether a residual pixel block associated with the current node is larger than a maximum-allowable TU size (368). In response to determining that residual pixel block associated with the current node is not larger than the maximum-allowable TU size ("NO" of 368), entropy decoding unit 150 may determine whether the residual pixel block associated with the current node is a minimum-allowable TU size (370).

In response to determining that the residual pixel block of the current node is not the minimum-allowable TU size ("NO" of 370), entropy decoding unit 150 may determine whether the Y CBF, U CBF, and V CBF of the current node are each equal to 0 (371). If the Y CBF, U CBF, and V CBF of the current node are each equal to 0, entropy decoding unit 150 may determine that the current node is a leaf node that is not associated with any significant coefficient blocks. Accordingly, if the Y CBF, U CBF, and V CBF of the current node are each equal to 0 ("YES" of 371), entropy decoding unit 150 may have finished parsing the current node. Thus, if the Y CBF of the node, the U CBF of the node, and the V CBF of the node all have a first value (e.g., 0), the node is not associated with a split flag, the split flag indicating whether the node has a plurality of child nodes.

In response to determining that the Y CBF, U CBF, and the V CBF syntax elements of the current node are not all equal to 0 ("NO" of 371), entropy decoding unit 150 may parse a split flag from the bitstream (372). The split flag may indicate whether the current node has a plurality of child nodes. Thus, if at least one of the Y CBF of the current node, the U CBF of the current node, and the V CBF of the current node has a second value (e.g., 1) that is different than the first value (e.g., 0), the current node is associated with the split flag. In this way, entropy decoding unit 150 may make, based on a Y CBF of a node of the RQT, a U CBF of the node, and a V CBF of the node, a determination to parse a split flag of a node of the RQT.

In some examples, video encoder 20 may perform CABAC encoding on the split flag. When video encoder 20 performs CABAC encoding on the split flag, video encoder 20 may select a coding context for the split flag. In some examples, video encoder 20 may select the coding context based on a CBF (e.g., Y CBF, U CBF, and/or V CBF) of the current node. Furthermore, in some examples, video encoder 20 may select the coding context based on the Y CBF, the U CBF, and the V CBF of the current node. Video encoder 20 may perform, based on the selected coding context, CABAC encoding on the split flag of the current node. Similarly, when entropy decoding unit 150 parses the split flag from the bitstream, entropy decoding unit 150 may select (e.g., based on a CBF of the current node) a coding context. In some examples, entropy decoding unit 150 may select the coding context based on the Y CBF, the U CBF, and/or the V CBF of the current node. Entropy decoding unit 150 may perform, based on the selected coding context, CABAC decoding on the split flag of the current node.

Entropy decoding unit 150 may determine whether the split flag is equal to 1 (374). In response to determining that the split flag is equal to 1 ("YES" of 374) or in response to determining that the residual pixel block associated with the current node is larger than the maximum-allowable TU size ("YES" of 368), entropy decoding unit 150 may parse the child nodes of the current node (376). In this way, entropy decoding unit 150 may, in response to making the determination to parse the split flag from the bitstream, determine, based on the split flag of the current node, whether to parse from the bitstream a plurality of child nodes of the current node. Entropy decoding unit 150 may parse the child nodes by performing operation 340 on each of the child nodes. In response to determining that the residual pixel block of the current node is the minimum-allowable TU size ("YES" of 370) or in response to determining that the split flag is not equal to 1 ("NO" of 374), entropy decoding unit 150 may perform the portion of operation 340 illustrated in the example of FIG. 10B.

Figure 10B:
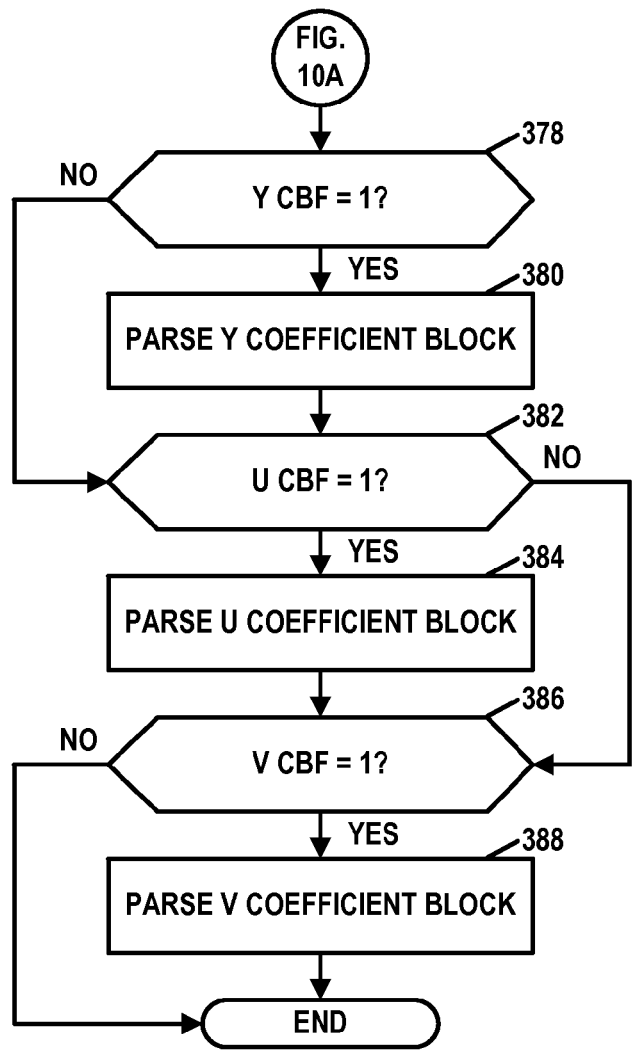
FIG. 10B is a flowchart illustrating a continuation of the example operation of FIG. 10A, in accordance with one or more techniques of this disclosure.

FIG. 10B is a flowchart illustrating a continuation of the example operation 340 of FIG. 10A, in accordance with one or more techniques of this disclosure. In the example of FIG. 10B, entropy decoding unit 150 may determine whether the Y CBF of the current node is equal to 1 (378). In response to determining that the Y CBF of the current node is equal to 1 ("YES" of 378), entropy decoding unit 150 may parse a Y coefficient block from the bitstream (380). Furthermore, in response to determining that the Y CBF of the current node is not equal to 1 ("NO" of 378) or after parsing the Y coefficient block from the bitstream (380), entropy decoding unit 150 may determine whether the U CBF of the current node is equal to 1 (382).

In response to determining that the U CBF of the current node is equal to 1 ("YES" of 382), entropy decoding unit 150 may parse a U coefficient block from the bitstream (384). Furthermore, in response to determining that the U CBF of the current node is not equal to 1 ("NO" of 382) or after parsing the U coefficient block from the bitstream (384), entropy decoding unit 150 may determine whether the V CBF of the current node is equal to 1 (386).

In response to determining that the V CBF of the current node is equal to 1 ("YES" of 386), entropy decoding unit 150 may parse a V coefficient block from the bitstream (388). Furthermore, in response to determining that the V CBF of the current node is not equal to 1 ("NO" of 386) or after parsing the V coefficient block from the bitstream (388), entropy decoding unit 150 may have finished parsing the current node. Although the discussion above has described particular behaviors when particular syntax elements have particular values (e.g., 0 or 1), the techniques of this disclosure may be applicable when the particular syntax elements have values other than those described above.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
   receiving or generating the video data, the video data representing a series of pictures;
   generating a bitstream that includes a sequence of bits that forms an encoded representation of the video data, the bitstream including data that represent a residual quad tree (RQT) for a coding unit (CU) of a picture of the series of pictures, the CU being larger than a maximum-allowable transform unit (TU) size, the RQT including a hierarchy of nodes, wherein a root node of the RQT corresponds to the CU as a whole, each of the nodes of the RQT corresponds to a respective block, and respective leaf nodes of the RQT correspond to respective TUs of the CU, wherein generating bitstream comprises:
      generating residual data for the CU based on predicted video blocks for one or more prediction units (PUs) of the CU and an original video block of the CU, wherein the residual data for the CU is partitioned into residual video blocks and each of the TUs of the CU is associated with a different one of the residual pixel blocks;
      for each respective node of the RQT, responsive to determining a block corresponding to the respective node is larger than the maximum-allowable TU size, automatically splitting, without encoding in the bitstream a split flag for the respective node, the block corresponding to the respective node into four sub-blocks corresponding to additional nodes of the RQT; and
      generating two chroma coded block flags (CBFs) at the root node of the RQT, each of the chroma CBFs indicating whether any of the TUs of the CU are associated with a significant chroma coefficient block that is based on samples of a respective chroma component; and
   outputting the bitstream.

2. The method of claim 1, wherein the root node is associated with a Y CBF that indicates whether any of the TUs of the CU are associated with a significant luma coefficient block.

3. The method of claim 1, wherein:
   the root node is associated with a flag,
   if the flag has a first value, at least one of the TUs of the CU is associated with a significant coefficient block, and
   if the flag has a second value that is different than the first value, none of the TUs of the CU is associated with a significant coefficient block, and no node in the RQT is associated with a Y CBF, a U CBF, or a V CBF.

4. The method of claim 1, wherein for each respective node in the RQT:
   if a Y CBF of the respective node, a U CBF of the respective node, and a V CBF of the respective node all have a first value, the respective node is not associated with a respective split flag indicating whether the respective node has a plurality of child nodes,
   if at least one of the Y CBF of the respective node, the U CBF of the respective node, and the V CBF of the respective node has a second value that is different than the first value, the respective node is associated with the respective split flag,
   wherein the Y CBF indicates whether any TU that corresponds to the respective node or a descendant node of the respective node is associated with a significant Y coefficient block,
   wherein the U CBF indicates whether any TU that corresponds to the respective node or a descendant node of the respective node is associated with a significant U coefficient block, and
   wherein the V CBF indicates whether any TU that corresponds to the respective node or a descendant node of the respective node is associated with a significant V coefficient block.

5. The method of claim 1, further comprising:
   selecting, based at least in part on a CBF of a node of the RQT, a coding context; and
   performing, based on the selected coding context, context-adaptive binary arithmetic coding (CABAC) encoding on a split flag of the node, the split flag indicating whether the node has a plurality of child nodes.

6. The method of claim 5, wherein selecting the coding context comprises selecting, based on a Y CBF of the node, a U CBF of the node, and a V CBF of the node, the coding context.

7. The method of claim 1, further comprising performing, based at least in part on a same coding context, CABAC encoding on a Y CBF, a U CBF, and a V CBF of a node in the RQT.

8. The method of claim 1, wherein a non-leaf node of the RQT is associated with a split flag, a Y CBF, a U CBF, and a V CBF, the split flag associated with the non-leaf node indicating that the non-leaf node has a plurality of descendant nodes, the Y CBF indicating whether any of the descendant nodes is associated with a significant luma coefficient block, the U CBF indicating whether any of the descendant nodes is associated with a significant U coefficient block, the V CBF indicating whether any of the descendant nodes is associated with a significant V coefficient block.

9. The method of claim 1, further comprising:
selecting, based on depths of nodes of the RQT, coding contexts for Y, U, and V CBFs specified by the nodes of the RQT; and
performing, based on the coding contexts selected for the Y, U, and V CBFs, entropy encoding operations on the Y, U, and V CBFs.

10. The method of claim 9, wherein selecting the coding contexts comprises selecting a coding context for a CBF, wherein an index value of the coding context is equal to a depth of a node in the RQT that specifies the CBF.

11. The method of claim 1, wherein, for each respective node in the RQT:
the respective node does not include a U CBF unless the respective node is the root node or a U CBF of a parent node of the respective node indicates that a descendant node of the parent node is associated with a significant U chroma block; and
the respective node does not include a V CBF unless the respective node is the root node or a V CBF of the parent node of the respective node indicates that a descendant node of the parent node is associated with a significant V chroma block.

12. A method for decoding video data, the method comprising:
receiving a bitstream that includes an encoded representation of the video data, the video data representing a series of pictures;
for each respective node of a residual quad tree (RQT) of a coding unit (CU) of a picture of the series of pictures, responsive to determining a block corresponding to the respective node is larger than a maximum-allowable transform unit (TU) size, automatically splitting, without parsing from the bitstream a split flag for the respective node, the block corresponding to the respective node into four sub-blocks corresponding to additional nodes of the RQT, the RQT including a hierarchy of nodes, a root node of the RQT corresponding to the CU as a whole, and respective leaf nodes of the RQT corresponding to respective TUs of the CU, each of the TUs of the CU being associated with a different residual pixel block;
parsing, from the bitstream, two chroma coded block flags (CBFs) at the root node of the RQT, wherein the CU is larger than the maximum-allowable TU size;
for each of the chroma CBFs, determining, based on the respective chroma CBF, whether any TU of the CU is associated with a significant chroma coefficient block that is based on samples of a respective chroma component;
based on a particular TU of the CU being associated with a significant chroma coefficient block, performing an inverse transform on coefficient blocks to reconstruct the residual pixel block associated with the particular TU of the CU, the significant chroma coefficient block being one of the coefficient blocks; and
reconstructing a video block of the CU based on one or more predictive pixel blocks of prediction units (PUs) of the CU and the residual pixel blocks associated with the TUs of the CU.

13. The method of claim 12, wherein the method further comprises parsing, from the bitstream, a Y CBF of the root node, the Y CBF of the root node indicating whether any leaf node of the RQT is associated with a significant luma coefficient block.

14. The method of claim 12, wherein the method further comprises parsing, from the bitstream, a flag of the root node, the flag indicating whether there is a leaf node of the RQT that is associated with a significant coefficient block, wherein if the flag indicates that no leaf node of the RQT is associated with a significant coefficient block, no node in the RQT is associated with a CBF.

15. The method of claim 12, further comprising:
making, based on a Y CBF of a node of the RQT, a U CBF of the node, and a V CBF of the node, a determination to parse a split flag of a node of the RQT; and
in response to making the determination, determining, based on the split flag of the node, whether to parse from the bitstream a plurality of child nodes of the node,
wherein the Y CBF indicates whether the node or any descendant node of the node is associated with a significant Y coefficient block, the U CBF indicates whether the node or any descendant node of the node is associated with a significant U coefficient block, and the V CBF indicates whether the node or any descendant node of the node is associated with a significant V coefficient block.

16. The method of claim 12, wherein the method further comprises:
selecting, based on a CBF of a node of the RQT, a coding context; and
performing, based on the selected coding context, context-adaptive binary arithmetic coding (CABAC) decoding on a split flag of the node, the split flag indicating whether the node has a plurality of child nodes.

17. The method of claim 16, wherein selecting the coding context comprises selecting, based on a Y CBF of the node, a U CBF of the node, and a V CBF of the node, the coding context.

18. The method of claim 12, further comprising performing, based on a same coding context, CABAC decoding on a Y CBF, a U CBF, and a V CBF of a node of the RQT.

19. The method of claim 12, wherein a non-leaf node of the RQT includes a split flag, a Y CBF, a U CBF, and a V CBF, the split flag of the non-leaf node indicating that the non-leaf node has a plurality of descendant nodes, the Y CBF indicating whether any of the descendant nodes is associated with a significant luma coefficient block, the U CBF indicating whether any of the descendant nodes is associated with a significant U coefficient block, the V CBF indicating whether any of the descendant nodes is associated with a significant V coefficient block.

20. The method of claim 12, further comprising:
selecting, based on depths of nodes of the RQT, coding contexts for Y, U, and V CBFs specified by the nodes of the RQT; and
performing, based on the coding contexts selected for the Y, U, and V CBFs, entropy decoding operations on the Y, U, and V CBFs.

21. The method of claim 20, wherein selecting the coding contexts comprises selecting a coding context for a CBF, wherein an index value of the coding context is equal to a depth of a node of the RQT that specifies the CBF.

22. The method of claim 12, wherein, for each respective node in the RQT:
the respective node does not include a U CBF unless the respective node is the root node or a U CBF of a parent node of the respective node indicates that a descendant node of the parent node is associated with a significant U chroma block; and the respective node does not include a V CBF unless the respective node is the root node or a V CBF of the parent node of the respective node indicates that a descendant node of the parent node is associated with a significant V chroma block.

23. A video encoding device that encodes video data, the video encoding device comprising:

one or more data storage media configured to store the video data, the video data representing a series of pictures; and one or more processors configured to generate a bitstream that includes a sequence of bits that forms an encoded representation of the video data, the bitstream including data that represents a residual quad tree (RQT) for a coding unit (CU) of a picture of the series of pictures, the CU being larger than a maximum-allowable transform unit (TU) size, the RQT including a hierarchy of nodes, wherein a root node of the RQT corresponds to the CU as a whole, each of the nodes of the RQT corresponds to a respective block, and respective leaf nodes of the RQT correspond to respective TUs of the CU, wherein the instructions configure the video encoding device such that, as part of generating the bitstream, the video encoding device:

generates residual data for the CU based on predicted video blocks for one or more prediction units (PUs) of the CU and an original video block of the CU, wherein the residual data for the CU is partitioned into residual video blocks and each of the TUs of the CU is associated with a different one of the residual pixel blocks;

for each respective node of the RQT, responsive to determining a block corresponding to the respective node is larger than the maximum-allowable TU size, automatically splits, without encoding in the bitstream a split flag for the respective node, the block corresponding to the respective node into four sub-blocks corresponding to additional nodes of the RQT; and includes two chroma coded block flags (CBFs) at the root node of the RQT, each of the chroma CBFs indicating whether any of the TUs of the CU are associated with a significant chroma coefficient block that is based on samples of a respective chroma component.

24. The video encoding device of claim 23, wherein the root node is associated with a Y CBF, the Y CBF indicating whether any of the TUs of the CU are associated with a significant luma coefficient block.

25. The video encoding device of claim 23, wherein:
the root node is associated with a flag,
if the flag has a first value, at least one of the TUs of the CU is associated with a significant coefficient block, and
if the flag has a second value that is different than the first value, none of the TUs of the CU is associated with a significant coefficient block, and no node in the RQT is associated with a Y CBF, a U CBF, or a V CBF.

26. The video encoding device of claim 23, wherein for each respective node in the RQT:
if a Y CBF of the respective node, a U CBF of the respective node, and a V CBF of the respective node all have a first value, the respective node is not associated with a respective split flag indicating whether the respective node has a plurality of child nodes,
if at least one of the Y CBF of the respective node, the U CBF of the respective node, and the V CBF of the respective node has a second value that is different than the first value, the respective node is associated with the respective split flag,
wherein the Y CBF indicates whether any TU that corresponds to the respective node or a descendant node of the respective node is associated with a significant Y coefficient block,
wherein the U CBF indicates whether any TU that corresponds to the respective node or a descendant node of the respective node is associated with a significant U coefficient block, and
wherein the V CBF indicates whether any TU that corresponds to the respective node or a descendant node of the respective node is associated with a significant V coefficient block.

27. The video encoding device of claim 23, wherein the one or more processors are configured to:
select, based on a CBF of a node of the RQT, a coding context; and
perform, based on the selected coding context, context-adaptive binary arithmetic coding (CABAC) encoding on a split flag of the node, the split flag indicating whether the node has a plurality of child nodes.

28. The video encoding device of claim 27, wherein the one or more processors are configured to select the coding context such that the one or more processors select, based on a Y CBF of the node, a U CBF of the node, and a V CBF of the node, the coding context.

29. The video encoding device of claim 23, wherein the one or more processors are configured to perform, based on a same coding context, CABAC encoding on a Y CBF, a U CBF, and a V CBF of a node of the RQT.

30. The video encoding device of claim 23, wherein a non-leaf node of the RQT includes a split flag, a Y CBF, a U CBF, and a V CBF, the split flag of the non-leaf node indicating that the non-leaf node has a plurality of descendant nodes, the Y CBF indicating whether any of the descendant nodes is associated with a significant luma coefficient block, the U CBF indicating whether any of the descendant nodes is associated with a significant U coefficient block, the V CBF indicating whether any of the descendant nodes is associated with a significant V coefficient block.

31. The video encoding device of claim 23, wherein the one or more processors are configured to:
select, based on depths of nodes of the RQT, coding contexts for Y, U, and V CBFs specified by the nodes of the RQT; and
perform, based on the coding contexts selected for the Y, U, and V CBFs, entropy encoding operations on the Y, U, and V CBFs.

32. The video encoding device of claim 31, wherein the one or more processors are configured to select the coding contexts such that the one or more processors select a coding context for a CBF, wherein an index value of the coding context is equal to a depth of a node of the RQT that specifies the CBF.

33. The video encoding device of claim 23, wherein, for each respective node in the RQT:
the respective node does not include a U CBF unless the respective node is the root node or a U CBF of a parent node of the respective node indicates that a descendant node of the parent node is associated with a significant U chroma block; and the respective node does not include a V CBF unless the respective node is the root node or a V CBF of the parent node of the respective node indicates that a descendant node of the parent node is associated with a significant V chroma block.

34. A video decoding device that decodes video data, the video decoding device comprising:

one or more data storage media configured to store the video data; and one or more processors configured to:

receive a bitstream that includes an encoded representation of the video data, the video data representing a series of pictures;

for each respective node of a residual quad tree (RQT) of a coding unit (CU) of a picture of the series of pictures, responsive to determining a block corresponding to the respective node is larger than a maximum-allowable transform unit (TU) size, automatically split, without parsing from the bitstream a split flag for the respective node, the block corresponding to the respective node into four sub-blocks corresponding to additional nodes of the RQT the RQT including a hierarchy of nodes, a root node of the RQT corresponding to the CU as a whole, and respective leaf nodes of the RQT corresponding to respective TUs of the CU, each of the TUs of the CU being associated with a different residual pixel block;

parse, from the bitstream, two chroma coded block flags (CBFs) at the root node of the RQT, wherein the CU is larger than the maximum-allowable TU size;

for each of the chroma CBFs, determine, based on the respective chroma CBF, whether any TU of the CU is associated with a significant chroma coefficient block that is based on samples of a respective chroma component;

based on a particular TU of the CU being associated with a significant chroma coefficient block, perform an inverse transform on coefficient blocks to reconstruct the residual pixel block associated with the particular TU of the CU, the significant chroma coefficient block being one of the coefficient blocks; and reconstruct a video block of the CU based on one or more predictive pixel blocks of prediction units (PUs) of the CU and the residual pixel blocks associated with the TUs of the CU.

35. The video decoding device of claim 34, wherein the one or more processors are further configured to parse, from the bitstream, a Y CBF of the root node, the Y CBF of the root node indicating whether any leaf node of the RQT is associated with a significant luma coefficient block.

36. The video decoding device of claim 34, wherein the one or more processors are further configured to parse, from the bitstream, a flag of the root node, the flag indicating whether there is a leaf node of the RQT that is associated with a significant coefficient block, wherein if the flag indicates that no leaf node of the RQT is associated with a significant coefficient block, no node of the RQT includes a CBF.

37. The video decoding device of claim 34, wherein the one or more processors are configured to:

make, based on a Y CBF of a node of the RQT, a U CBF of the node, and a V CBF of the node, a determination to parse a split flag of a node of the RQT; and in response to making the determination, determine, based on the split flag of the node, whether to parse from the bitstream a plurality of child nodes of the node, wherein the Y CBF indicates whether the node or any descendant node of the node is associated with a significant Y coefficient block, the U CBF indicates whether the node or any descendant node of the node is associated with a significant U coefficient block, and the V CBF indicates whether the node or any descendant node of the node is associated with a significant V coefficient block.

38. The video decoding device of claim 34, wherein the one or more processors are configured to:

select, based on a CBF of a node of the RQT, a coding context; and perform, based on the selected coding context, context-adaptive binary arithmetic coding (CABAC) decoding on a split flag of the node, the split flag indicating whether the node has a plurality of child nodes.

39. The video decoding device of claim 38, wherein the one or more processors are configured to select, based on a Y CBF of the node, a U CBF of the node, and a V CBF of the node, the coding context.

40. The video decoding device of claim 34, wherein the one or more processors are configured to perform, based on a same coding context, CABAC decoding on a Y CBF of a node of the RQT, a U CBF of the node, and a V CBF of the node.

41. The video decoding device of claim 34, wherein a non-leaf node of the RQT includes a split flag, a Y CBF, a U CBF, and a V CBF, the split flag of the non-leaf node indicating that the non-leaf node has a plurality of descendant nodes, the Y CBF indicating whether any of the descendant nodes is associated with a significant luma coefficient block, the U CBF indicating whether any of the descendant nodes is associated with a significant U coefficient block, the V CBF indicating whether any of the descendant nodes is associated with a significant V coefficient block.

42. The video decoding device of claim 34, wherein the one or more processors are further configured to:

select, based on depths of nodes of the RQT, coding contexts for Y, U, and V CBFs specified by the nodes of the RQT; and perform, based on the coding contexts selected for the Y, U, and V CBFs, entropy decoding operations on the Y, U, and V CBFs.

43. The video decoding device of claim 42, wherein the one or more processors are configured to select the coding contexts such that the one or more processors select a coding context for a CBF, wherein an index value of the coding context is equal to a depth of a node of the RQT that specifies the CBF.

44. The video decoding device of claim 34, wherein, for each respective node in the RQT:

the respective node does not include a U CBF unless the respective node is the root node or a U CBF of a parent node of the respective node indicates that a descendant node of the parent node is associated with a significant U chroma block; and the respective node does not include a V CBF unless the respective node is the root node or a V CBF of the parent node of the respective node indicates that a descendant node of the parent node is associated with a significant V chroma block.

45. A video encoding device that encodes video data, the video encoding device comprising:

means for receiving or generating the video data, the video data representing a series of pictures; and means for generating a bitstream that includes a sequence of bits that forms an encoded representation of the video data, the bitstream including data that represent a residual quad tree (RQT) for a coding unit (CU) of the video data, the CU being larger than a maximum-allowable transform unit (TU) size, the RQT including a hierarchy of nodes, wherein a root node of the RQT corresponds to the CU as a whole, each of the nodes of the RQT corresponds to a respective block, and respective leaf nodes of the RQT correspond to respective TUs of the CU, wherein the means for generating the bitstream comprises:

means for generating residual data for the CU based on predicted video blocks for one or more prediction units (PUs) of the CU and an original video block of the CU, wherein the residual data for the CU is partitioned into residual video blocks and each of the TUs of the CU is associated with a different one of the residual pixel blocks;

for each respective node of the RQT, means for automatically splitting, responsive to determining a block corresponding to the respective node is larger than the maximum-allowable TU size, without encoding in the bitstream a split flag for the respective node, the block corresponding to the respective node into four sub-blocks corresponding to additional nodes of the RQT; and means for including two chroma coded block flags (CBFs) at the root node of the RQT, each of the chroma CBFs indicating whether any of the TUs of the CU are associated with a significant chroma coefficient block that is based on samples of a respective chroma component.

46. A video decoding device that decodes video data, the video decoding device comprising:

means for receiving a bitstream that includes an encoded representation of the video data, the video data representing a series of pictures;

for each respective node of a residual quad tree (RQT) of a coding unit (CU) of a picture of the series of pictures, means for automatically splitting, responsive to determining a block corresponding to the respective node is larger than a maximum-allowable transform unit (TU) size, without parsing from the bitstream a split flag for the respective node, the block corresponding to the respective node into four sub-blocks corresponding to additional nodes of the RQT, the RQT including a hierarchy of nodes, a root node of the RQT corresponding to the CU as a whole, and respective leaf nodes of the RQT corresponding to respective TUs of the CU, each of the TUs of the CU being associated with a different residual pixel block;

means for parsing, from the bitstream, two chroma coded block flags (CBFs) at the root node of the RQT, wherein the CU is larger than the maximum-allowable TU size;

for each of the chroma CBFs, means for determining, based on the respective chroma CBF, whether any TU of the CU is associated with a significant chroma coefficient block that is based on samples of a respective chroma component;

means for performing, based on a particular TU of the CU being associated with a significant chroma coefficient block, an inverse transform on coefficient blocks to reconstruct the residual pixel block associated with the particular TU of the CU, the significant chroma coefficient block being one of the coefficient blocks; and means for reconstructing a video block of the CU based on one or more predictive pixel blocks of prediction units (PUs) of the CU and the residual pixel blocks associated with the TUs of the CU.

47. A non-transitory computer-readable storage medium that stores instructions that, when executed by one or more processors of a video encoding device, configure the video encoding device to:

receive or generate video data, the video data representing a series of pictures;

generate a bitstream that includes a sequence of bits that forms an encoded representation of the video data, the bitstream including data that represent a residual quad tree (RQT) for a coding unit (CU) of a picture of the series of pictures, the CU being larger than a maximum-allowable transform unit (TU) size, the RQT including a hierarchy of nodes, wherein a root node of the RQT corresponds to the CU as a whole, each of the nodes of the RQT corresponds to a respective block, and respective leaf nodes of the RQT correspond to respective TUs of the CU, wherein the instructions configure the video encoding device such that, as part of generating the bitstream, the video encoding device:

generate residual data for the CU based on predicted video blocks for one or more prediction units (PUs) of the CU and an original video block of the CU, wherein the residual data for the CU is partitioned into residual video blocks and each of the TUs of the CU is associated with a different one of the residual pixel blocks;

for each respective node of the RQT, responsive to determining a block corresponding to the respective node is larger than the maximum-allowable TU size, automatically splits, without encoding in the bitstream a split flag for the respective node, the block corresponding to the respective node into four sub-blocks corresponding to additional nodes of the RQT; and includes two chroma coded block flags (CBFs) at the root node of the RQT, each of the chroma CBFs indicating whether any of the TUs of the CU are associated with a significant chroma coefficient block that is based on samples of a respective chroma component; and output the bitstream.

48. A non-transitory computer-readable storage medium that stores instructions that, when executed by one or more processors of a video decoding device, configure the video decoding device to:

receive a bitstream that includes an encoded representation of video data, the video data representing a series of pictures;

for each respective node of a residual quad tree (RQT) of a coding unit (CU) of a picture of the series of pictures, responsive to determining a block corresponding to the respective node is larger than a maximum-allowable transform unit (TU) size, automatically split, without parsing from the bitstream a split flag for the respective node, the block corresponding to the respective node into four sub-blocks corresponding to additional nodes of the RQT, the RQT including a hierarchy of nodes, a root node of the RQT corresponding to the CU as a whole, and respective leaf nodes of the RQT corresponding to respective TUs of the CU, each of the TUs of the CU being associated with a different residual pixel block;

parse, from the bitstream, two chroma coded block flags (CBFs) at the root node of the RQT, wherein the CU is larger than the maximum-allowable TU size;

for each of the chroma CBFs, determining, based on the respective chroma CBF, whether any TU of the CU is associated with a significant chroma coefficient block that is based on samples of a respective chroma component;

based on a particular TU of the CU being associated with a significant chroma coefficient block, perform an inverse transform on coefficient blocks to reconstruct the residual pixel block associated with the particular TU of the CU, the significant chroma coefficient block being one of the coefficient blocks; and reconstruct a video block of the CU based on one or more predictive pixel blocks of prediction units (PUs) of the CU and the residual pixel blocks associated with the TUs of the CU.

49. The method of claim 12, further comprising:
reconstructing, based in part on the chroma coefficient block, a picture of the video data.

50. The video decoding device of claim 34, wherein the video decoding device comprises at least one of:
an integrated circuit;
a microprocessor; or
a wireless communication device.

51. The video decoding device of claim 34, further comprising a display configured to display the decoded video data.

52. The video encoding device of claim 23, further comprising a camera configured to capture the video data.

* * * * *